United States Patent
Nguyen et al.

(10) Patent No.: US 10,527,142 B2
(45) Date of Patent: Jan. 7, 2020

(54) HYDRAULIC ROTARY BALL SCREW ACTUATOR

(71) Applicant: Parker-Hannifin Corporation, Cleveland, OH (US)

(72) Inventors: Dan T. Nguyen, Mission Viejo, CA (US); Ted A. McKay, Foothill Ranch, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 121 days.

(21) Appl. No.: 15/597,348

(22) Filed: May 17, 2017

(65) Prior Publication Data

US 2017/0335932 A1 Nov. 23, 2017

Related U.S. Application Data

(60) Provisional application No. 62/340,070, filed on May 23, 2016.

(51) Int. Cl.
| | |
|---|---|
| *B64C 13/36* | (2006.01) |
| *F16H 25/22* | (2006.01) |
| *F16H 25/20* | (2006.01) |
| *B64C 13/28* | (2006.01) |

(52) U.S. Cl.
CPC ......... *F16H 25/2214* (2013.01); *B64C 13/28* (2013.01); *B64C 13/36* (2013.01); *F16H 25/2204* (2013.01); *F16H 2025/2028* (2013.01); *F16H 2025/2062* (2013.01)

(58) Field of Classification Search
CPC .............. F15B 15/068; F16H 25/2214; F16H 25/2204; F16H 2025/2028; F16H 2025/2062; B64C 13/36; B64C 13/28
USPC .......................................................... 74/89.23
See application file for complete search history.

(56) References Cited

U.S. PATENT DOCUMENTS

| | | | | |
|---|---|---|---|---|
| 3,046,808 | A | * | 7/1962 | De Mart ............. F16H 25/2204 254/103 |
| 3,333,483 | A | * | 8/1967 | Maci ........................ B60T 1/06 188/134 |
| 4,691,582 | A | * | 9/1987 | Weyer ................ B60G 21/0553 244/99.7 |
| 4,738,415 | A | * | 4/1988 | Weyer ..................... B64C 13/36 244/213 |

(Continued)

*Primary Examiner* — Victor L MacArthur
*Assistant Examiner* — Gregory Robert Weber
(74) *Attorney, Agent, or Firm* — Renner, Otto, Boisselle & Sklar, LLP

(57) ABSTRACT

A rotary hydraulic actuator may be configured to output rotary motion to control a hinged surface of an aircraft. The actuator includes a nested ballscrew, ballnut, and output assembly that form concentric ball races for converting the linear motion and force of the linear actuator to rotary motion and torque of the output assembly that is connected to the hinged surface. One of the ball races is helically inclined and the other of the ball races is linear. The rotary hydraulic actuator may include a ball return structure that returns the balls from a loaded path of a ball race to an unloaded path of the ball race. The ball return structure may define a ball return path that is located at the same radial distance from the actuator centerline as the loaded path for minimizing the overall diameter of the actuator.

17 Claims, 18 Drawing Sheets

(56) References Cited

U.S. PATENT DOCUMENTS

| | | | |
|---|---|---|---|
| 4,939,946 A * | 7/1990 | Teramachi | F16H 25/2018 384/43 |
| 4,945,779 A * | 8/1990 | Williams | F15B 15/068 244/213 |
| 5,094,118 A * | 3/1992 | Morita | B25J 9/102 74/424.9 |
| 6,212,889 B1 * | 4/2001 | Martin | F15B 15/068 60/602 |
| 6,361,033 B1 * | 3/2002 | Jones | B60G 21/0555 188/266.3 |
| 6,672,540 B1 | 1/2004 | Shaheen et al. | |
| 7,267,044 B1 | 9/2007 | Klinger | |
| 8,141,448 B2 * | 3/2012 | Watanabe | F16C 29/0688 74/424.81 |
| 8,757,024 B2 * | 6/2014 | Singh | F16H 25/2228 74/424.82 |
| 9,139,286 B2 * | 9/2015 | Parker | B64C 9/02 |
| 9,371,895 B2 * | 6/2016 | Pizzoni | F16H 25/2214 |
| 9,476,433 B2 * | 10/2016 | Jang | F15B 15/068 |
| 2009/0100949 A1 * | 4/2009 | Shirai | F16C 29/005 74/89.14 |
| 2009/0282940 A1 | 11/2009 | Fujii | |
| 2012/0042741 A1 | 2/2012 | Jacob et al. | |
| 2012/0079901 A1 | 4/2012 | Shu | |
| 2014/0219771 A1 | 8/2014 | Henrickson et al. | |

* cited by examiner

HYDRAULIC ROTARY BALL SCREW ACTUATOR

This application claims priority of U.S. Provisional Patent Application No. 62/340,070 filed May 23, 2016, which is hereby incorporated herein by reference.

FIELD OF INVENTION

The present invention relates generally to aircraft actuators for moving aircraft flight control surfaces, and more particularly to a hydraulic rotary ballscrew actuator.

BACKGROUND

Aircrafts typically include a plurality of flight control surfaces that, when controllably positioned, guide movement of the aircraft through the air. The number and type of flight control surfaces included in an aircraft may vary, but typically both primary flight control surfaces and secondary flight control surfaces are included. The primary flight control surfaces are those that are used to control aircraft movement about the pitch, yaw and roll axes, and the secondary flight control surfaces are those that are used to influence the lift or drag (or both) of the aircraft. Although some aircraft may include additional control surfaces, the primary flight control surfaces typically include a pair of elevators, a pair of ailerons and a rudder, and the secondary flight control surfaces typically include a horizontal stabilizer, and a plurality of flaps, slats and spoilers.

Modern aircrafts have horizontal stabilizers located at the tail section of the fuselage or the rudder section that are pivotably supported relative to the airplane fuselage to "trim" the aircraft during flight by selective adjustment by the pilot via an internal control unit. Adjusting the position of the horizontal stabilizer by a stabilizer actuator accommodates different load distributions within the aircraft and different atmospheric conditions, i.e. wind, rain, snow, temperature variation, etc. The stabilizer is traditionally pivotably connected to the tail section of the fuselage at a point along its length, such as generally midway along its length.

Conventional trimmable horizontal stabilizer actuators consist of a ballnut assembly connected with an actuating drive gimbal which is pivotably connected to one end of the horizontal stabilizer structure. The ballnut assembly includes a ballnut housing and a ballscrew extending axially and usually vertically through the ballnut housing and through a drive gimbal housing. The ballnut housing is connected to the drive gimbal housing by a trunnion segment. The ballscrew, in turn, may have its proximal end remote from the actuating drive gimbal and may be fixed from translation or axial movement by a connection to a second, support gimbal which is typically pivotably secured to the tail section.

As the ballscrew is rotated, the drive gimbal and ballnut housing will be moved in translation. Thus, as the ballscrew is rotated in one direction, the ballnut housing is moved towards the ballscrew distal end and the leading edge of the horizontal stabilizer is pivoted upward in a first direction. On the other hand, by rotating the ballscrew in an opposite direction, the ballnut housing is moved toward the ballscrew proximal end and the leading edge of the horizontal stabilizer is pivoted downward in a second direction. Rotation of the ballscrew is routinely effected by a motor and associated gearing which is actuated by the pilot via the internal control unit.

The aforementioned linear output actuator may be generally suitable for actuating different flight control surfaces. However, the linear output actuator may not be suitable for directly supporting a hinged flight control surface, such as an aileron located at a trailing edge of an aircraft wing. Actuating the hinged flight control surface may include coupling the linear output actuator to the hinged flight control surface via a horn arm lever for transforming the linear motion into rotary motion. Using the horn arm lever may be disadvantageous in that the articulation of the lever and the associated components used to perform the linear to rotary transformation may require more envelope than the wing height, particularly in aircraft designs where the wings are thin.

Rotary geared actuators and rotary vane hydraulic actuators have been used for controlling hinged flight control surfaces. However, rotary vane hydraulic actuators have inherent sealing and packaging issues. Rotary geared actuators have inherent complexity in motor drives, higher jamming failure rates, damping issues and back-driving limitations, in that rotary geared actuators are generally not capable of back-driving when the actuator is unpowered or in a failure state. Helical actuators may also be deficient in that helical actuators may also be incapable of back-driving.

SUMMARY OF INVENTION

The present invention provides a rotary hydraulic actuator that is configured to output rotary motion to control a hinged surface of an aircraft. The actuator includes a linear hydraulic actuator having a self-contained linear to rotary transformation mechanism. The actuator may use a nested ballscrew, ballnut, and output assembly that that converts linear motion and force to rotary motion and torque. The actuator generally may use concentric ball races that are arranged between the ballscrew and the output assembly to convert the linear motion of the linear actuator to rotary motion of the output assembly that may be connected to the hinged surface. One of the ball races may be helically inclined and the other of the ball races may be linear. Additionally, the rotary hydraulic actuator may implement a ball return structure that returns the balls from a loaded path of a ball race to an unloaded path of the ball race. The ball return structure may define a ball return path that is located at the same radial distance from the actuator centerline as the loaded path for minimizing the overall diameter of the actuator.

According to one aspect, a rotary hydraulic actuator may include a ballscrew mechanism driven by a linear input mechanism, and the ballscrew mechanism may have a nested ballscrew arranged along a central axis. The rotary hydraulic actuator may include a linear ball race that is arranged along the central axis and has a linear loaded track portion and a linear unloaded track portion that is parallel and adjacent the linear loaded track portion, and a helically inclined ball race that is arranged along the central axis and has a helical loaded track portion and a helical unloaded track portion that is parallel and adjacent the helical loaded track portion. One of the linear ball race and helically inclined ball race is concentrically arranged relative to the other. The rotary hydraulic actuator may include a rotary output mechanism concentrically surrounding the ballscrew mechanism, and the rotary output mechanism may have at least one bearing preventing linear movement of the rotary output mechanism. The linear ball race and the helically inclined ball race are arranged between the ballscrew mechanism and the rotary output mechanism for converting linear movement from the linear input mechanism to rotary movement of the rotary output mechanism.

According to another aspect, a rotary hydraulic actuator may be coupled between a reference surface and an actuated surface that is moveable relative to the reference surface. The rotary hydraulic actuator may include a ballscrew assembly having a stationary portion and a ballscrew shaft that circumscribes a central axis, the stationary portion being coupled to the reference structure, the ballscrew shaft being fixed at a location between the reference surface and the actuated surface, wherein the ballscrew shaft circumscribes a central axis. The rotary hydraulic actuator may include a linear input mechanism coupled to the ballscrew assembly and an output assembly that is coupled to the actuated surface and includes a ballnut, the ballnut being concentrically arranged over the ballscrew shaft, the ballscrew assembly and the output assembly defining a first ball race and a second ball race, the output assembly having a thrust bearing coupled between the output assembly and the stationary portion of the ballscrew assembly that restricts axial movement of the output assembly. One of the first ball race and the second ball race may be helically inclined relative to the central axis and the other of the first ball race and the second ball race may be co-axially arranged relative to the central axis, the first ball race and the second ball race being arranged between the ballscrew assembly and the output assembly for converting linear movement from the linear input mechanism to rotary movement of the output assembly.

According to still another aspect, a rotary hydraulic actuator may be coupled between a reference surface and an actuated surface that is moveable relative to the reference surface. The rotary hydraulic actuator may include a reciprocating linear hydraulic piston, a ballscrew mechanism driven by the linear hydraulic piston, the ballscrew mechanism having a nested ballscrew and a ballnut arranged along a central axis, the ballscrew being fastened to the linear hydraulic piston. The rotary hydraulic actuator may include a first bearing arranged between the ballscrew and the ballnut to form a first ball race, wherein the first ball race has a plurality of loaded track portions and a plurality of unloaded track portions. The rotary hydraulic actuator may include a rotary output mechanism concentrically surrounding the ballnut or the ballscrew and having a thrust bearing for constraining linear movement of the rotary output mechanism, the rotary output mechanism having a second bearing for forming a second ball race that is concentrically arranged over the first ball race, wherein the second ball race has a plurality of loaded track portions and a plurality of unloaded track portions, and a ball return portion arranged between the plurality of loaded track portions and the plurality of unloaded track portions of at least one of the first ball race and the second ball race. One of the first ball race and the second ball race is helically inclined relative to the central axis and the other of the first ball race and the second ball race is co-axially arranged relative to the central axis, the first ball race and the second ball race being arranged between the ballscrew mechanism and the rotary output mechanism for converting linear movement from the linear hydraulic piston to rotary movement of the rotary output mechanism.

The foregoing and other features of the invention are hereinafter described in greater detail with reference to the accompanying drawings.

DETAILED DESCRIPTION

The principles of the present invention have particular application to flight control actuators for controlling a flight control surface of a vehicle, such as an aileron of an aircraft. The principles may also be applicable to any suitable rotary actuators in many other applications.

Figure 1A:
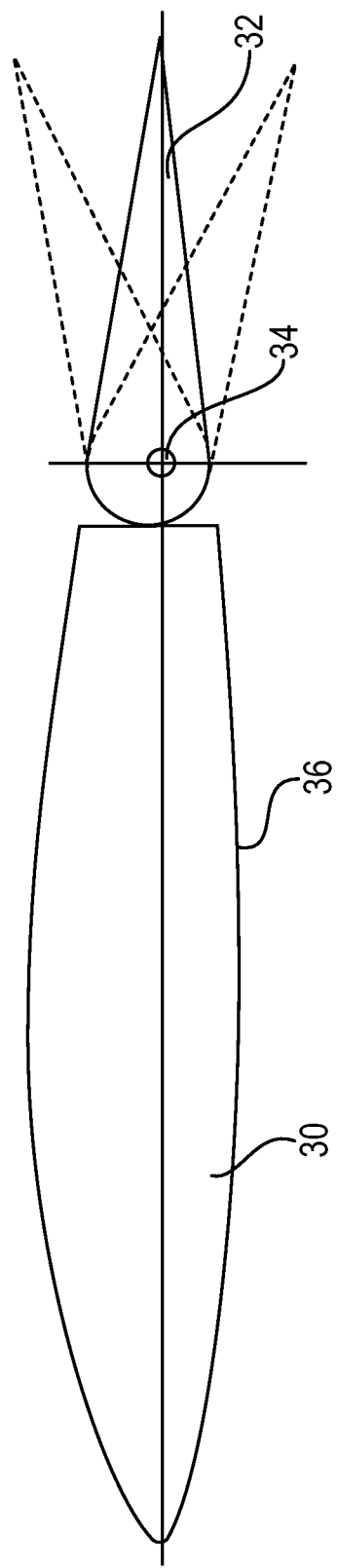
FIG. 1A is a schematic drawing of a hinged control surface of an aircraft.
Figure 1B:
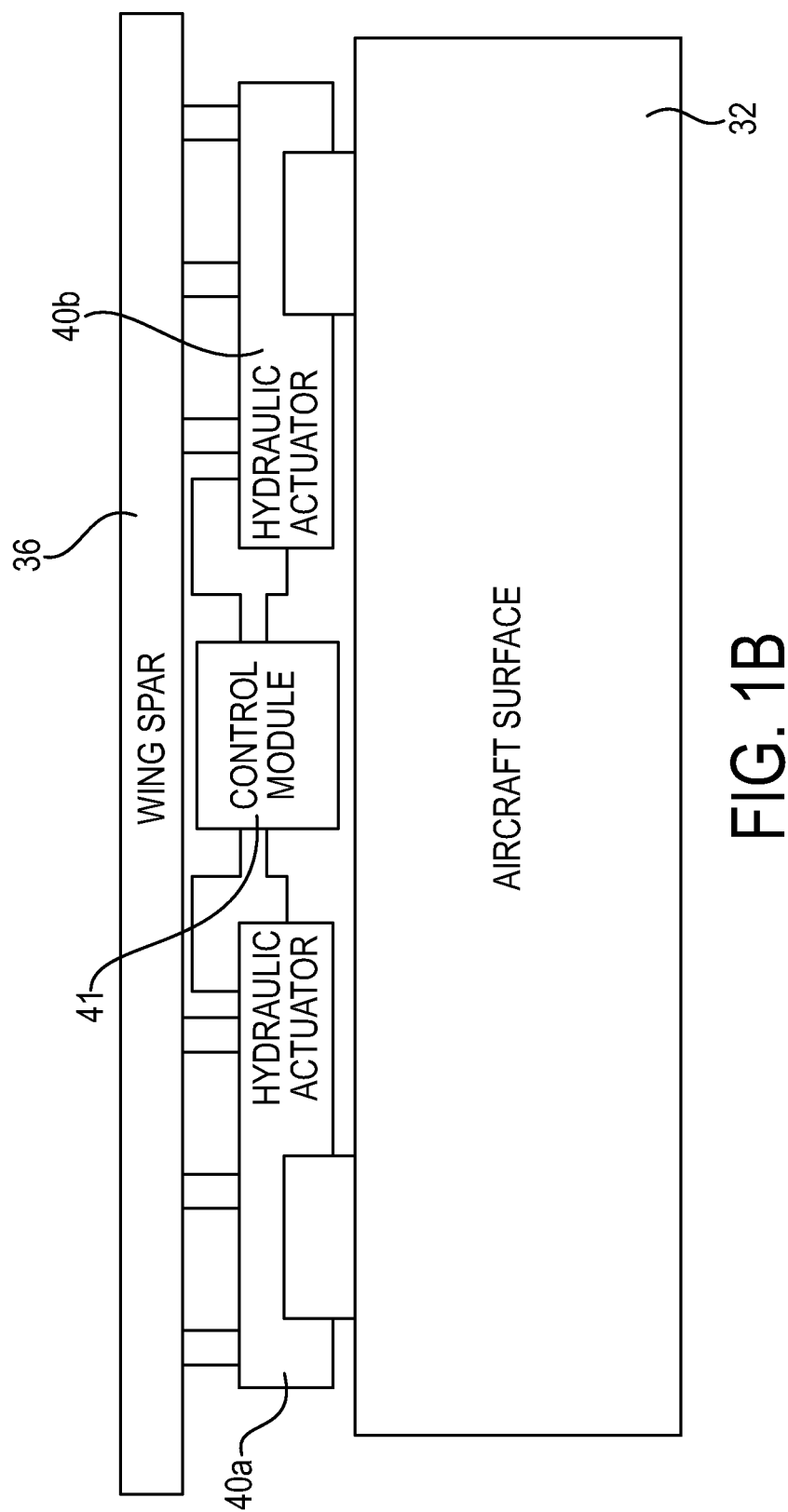
FIG. 1B is a schematic drawing showing a system with two rotary hydraulic actuators arranged between a surface of the aircraft and a wing spar of the aircraft.

Referring first to FIG. 1A, an aircraft wing 30 is schematically shown. The aircraft wing 30 may extend outwardly from a main body of an aircraft (not shown) to a control surface 32. The control surface 32 may be located at the trailing edge of the aircraft wing 30 and the control surface 32 may be an aileron for providing control about the roll axis of the aircraft. The aileron may have any suitable configuration and may, for example, be a frise type or differential type of aileron as are known in the art. The aircraft wing 30 may be a reference surface and may be fixed. The control surface 32 may be an actuated surface that is rotatable relative to the aircraft wing 30. The control surface 32 may be coupled to the aircraft wing 30 via a hinge 34, and the aircraft wing 30 may generally include a frame 36. During flight, the control surface 32 may be rotatable about the hinge 34, as schematically shown by phantom lines in FIG. 1A. Referring in addition to FIG. 1B, the control surface 32 may be adjusted by at least one rotary hydraulic actuator 40a, 40b that provides a rotational torque actuator output to support the control surface 32.

As discussed further below, the at least one rotary hydraulic actuator 40a, 40b may be coupled between the aircraft wing frame 36 and the control surface 32. One rotary hydraulic actuator may be provided or any suitable number of rotary hydraulic actuators may be provided. The rotary hydraulic actuators 40*a*, 40*b* may be coupled to the aircraft wing or an aircraft surface 30 and the control surface 32 using any suitable mounting mechanism. The rotary hydraulic actuator may include a nested ballscrew, ballnut assembly, and output assembly for converting linear motion and force to rotary motion and torque. Using the rotary hydraulic actuator may be advantageous in that the rotary hydraulic actuator is self-contained, enabling the linear-to-rotary transformation to take place in a compact and reliable manner for supporting thin wing and rotary hinge line flight control actuation.

As shown in FIG. 1B, the plurality of rotary hydraulic actuators 40*a*, 40*b* may be coupled between the aircraft surface frame 36 and the control surface 32. The control surface 32 may be a control panel. In another configuration, the rotary hydraulic actuators 40*a*, 40*b* may be coupled to one another and to the aircraft and control surfaces. Coupling the rotary hydraulic actuators to one another may be advantageous in that the actuators may accommodate for any position misalignment of the multiple actuators that may create a force fight load and fatigue the aircraft structure. As schematically shown in FIG. 1B, the actuator or plurality of actuators 40*a*, 40*b* may be automatically controlled directly from the aircraft's flight computers 41 (for example, an automatic flight control module, or any automatic control module in other applications) and/or may be manually controlled by pilot input.

Referring now to FIGS. 2-9, a rotary hydraulic actuator 40 according to a first embodiment is shown. The rotary hydraulic actuator 40 may be located within the frame 36 of the aircraft wing 30 (shown in FIG. 1A). The rotary hydraulic actuator 40 may be enclosed within the frame 36. The rotary hydraulic actuator 40 may include a ballscrew assembly 42, a ballnut assembly 44, an output assembly 46, and a hydraulically actuatable linear input mechanism 48. The output assembly 46 which includes the ballnut assembly 44 may be concentrically arranged over the ballscrew assembly 42. The ballnut assembly 44 may be adjacently coupled to the linear input mechanism 48.

Figure 2:
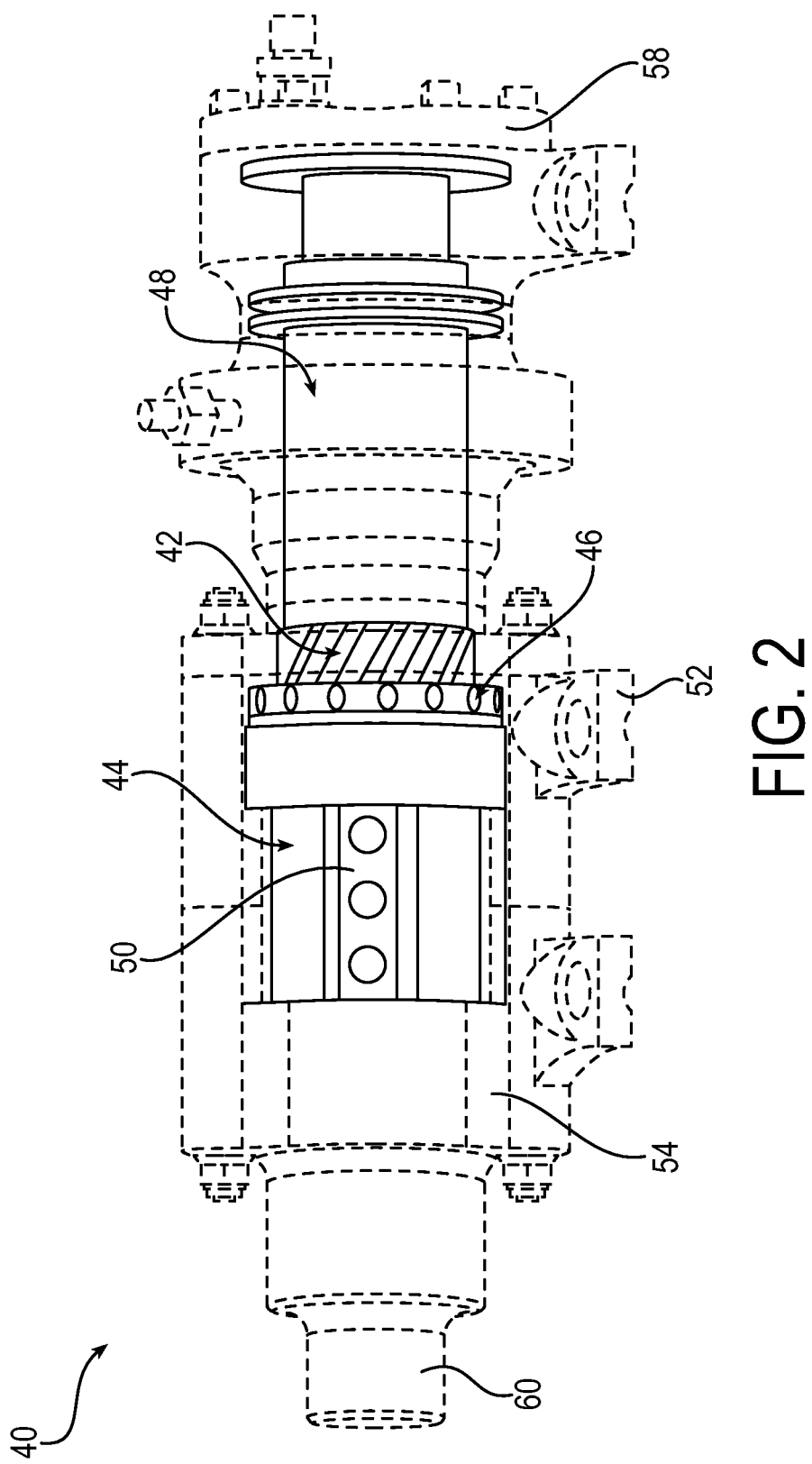
FIG. 2 is a transparency view of the rotary hydraulic actuator according to a first embodiment.
Figure 3:
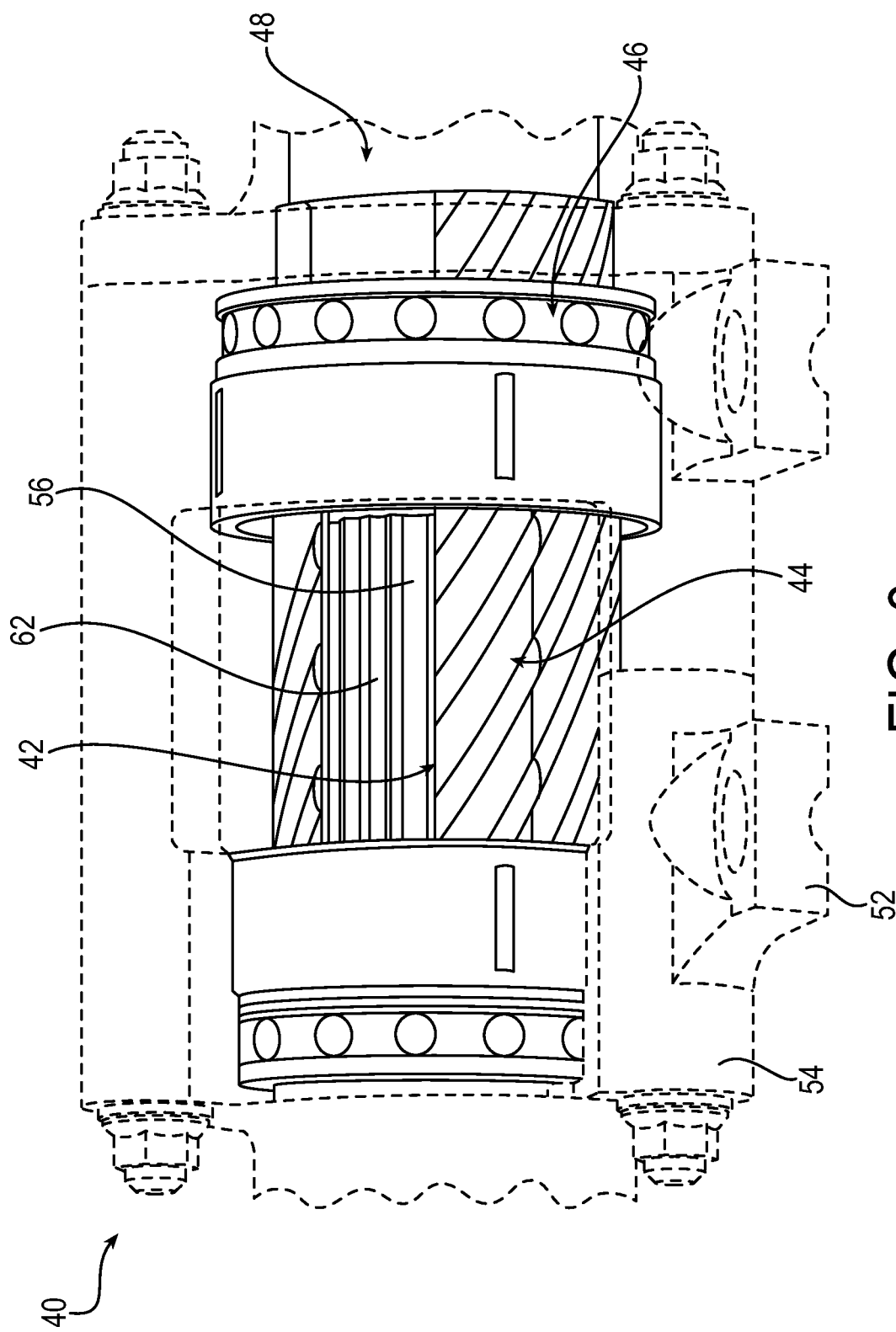
FIG. 3 is a detailed sectional view of the actuator of FIG. 2.
Figure 4:
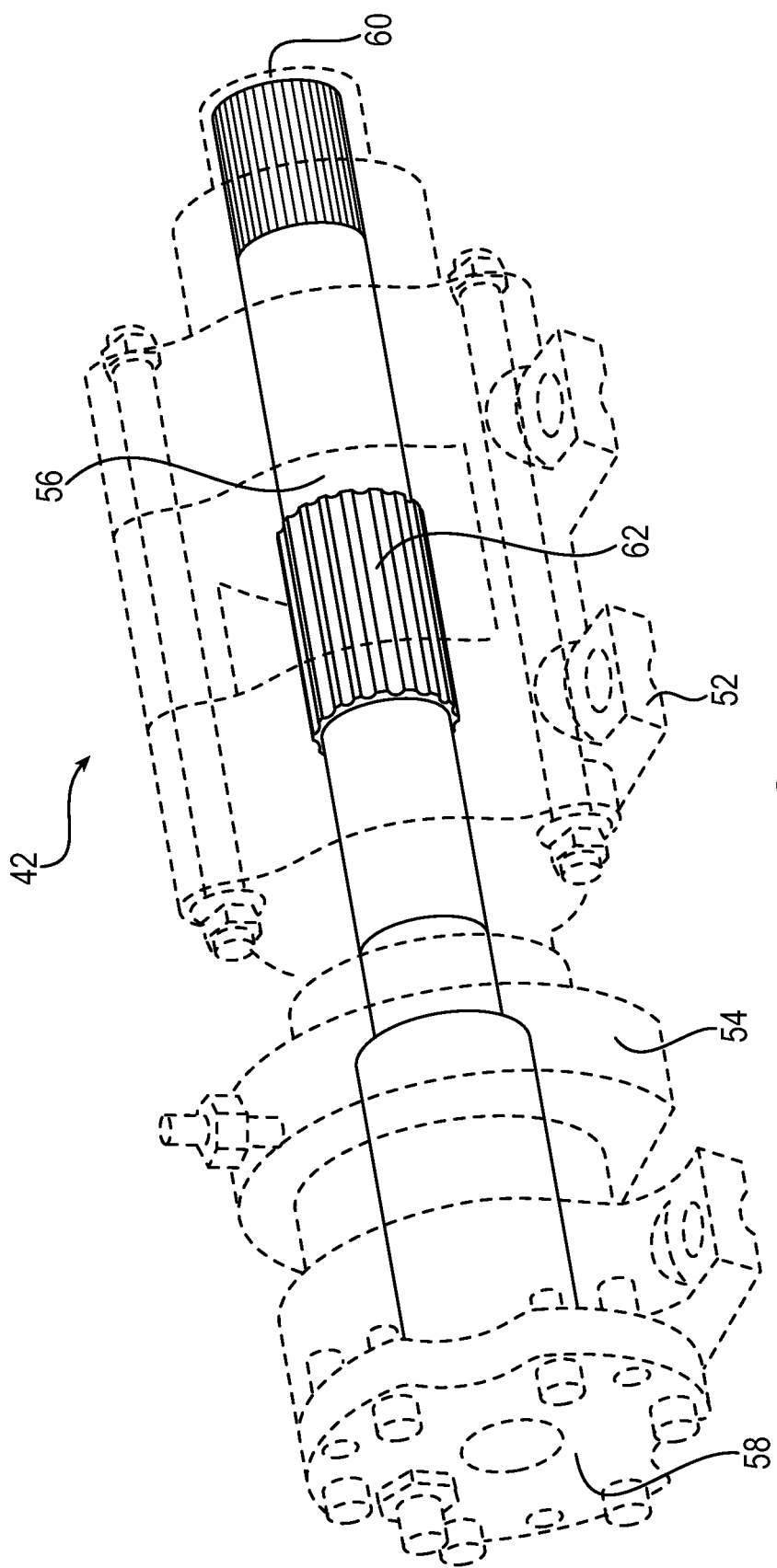
FIG. 4 is a transparency view focusing on the ballspline of the actuator according to a first embodiment.

As shown in FIG. 2, the rotary hydraulic actuator 40 may include a mounting feature 50 for coupling the rotary hydraulic actuator 40 to the control surface 32. As best shown in FIGS. 2-4, the rotary hydraulic actuator 30 may also include a mounting feature 52 for coupling the rotary hydraulic actuator 30 to a main structural member of the aircraft wing 30, such as a spar for carrying structural loads. The mounting feature 52 may have any suitable shape or configuration. As best shown in FIG. 2, the mounting feature 52 may include a plurality of flanges that extend from a housing 54 for the rotary hydraulic actuator 30. The hydraulic actuator 40 may be arranged along a longitudinal or central axis and the housing 54 may extend along the central axis. The longitudinal axis may be the centerline of the actuator 40 and the mounting feature 52 or flanges may extend radially outwardly relative to the centerline of the actuator 40.

As best shown in FIG. 3 and FIG. 4, the ballscrew assembly 42 may include a ballspline shaft. The ballspline shaft may be in the form of a linear bearing shaft 56 that circumscribes the central axis of the rotary hydraulic actuator 30. The linear bearing shaft 56 may extend between a first end 58 and a second end 60 of the actuator housing 54. The linear bearing shaft 56 may be fixedly mounted at the first end 58 and the second end 60. The linear bearing shaft 56 may include a splined portion 62 where the splines extend longitudinally along the actuator centerline, such that the ballscrew assembly 42 includes a ballspline for receiving a plurality of ball members and/or rollers (not shown). The ball members may be moveable along the ballspline in response to actuation by the linear input mechanism 48.

Figure 5:
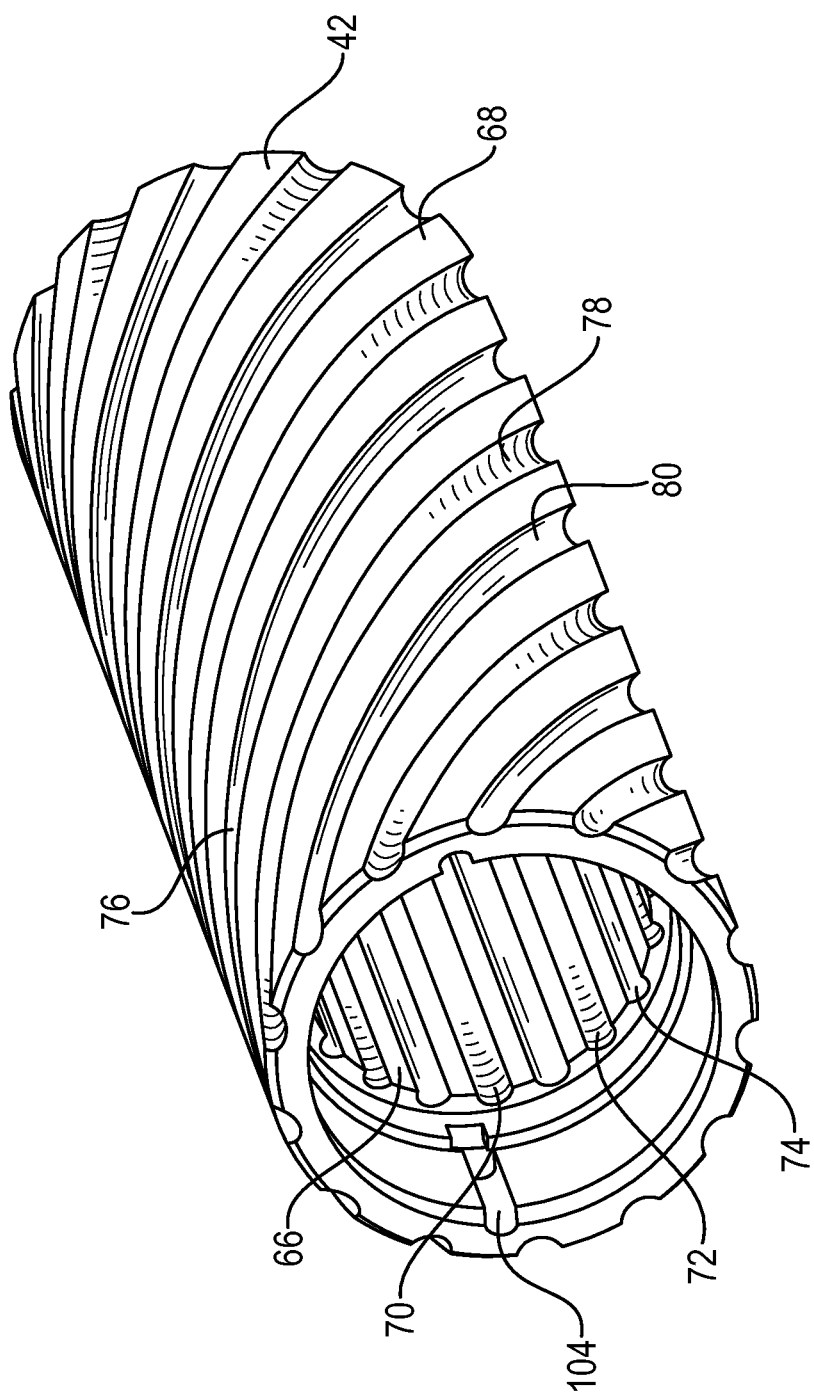
FIG. 5 shows a ballscrew of the actuator according to a first embodiment.

FIG. 5 shows an exemplary embodiment of the ballscrew 42. The ballscrew 42 may extend along the actuator centerline and concentrically surround the linear bearing shaft 56 (as shown in FIGS. 2 and 3). A plurality of paths for receiving the plurality of ball members, and along which the plurality of ball members travel, may be formed on an inner diameter 66 and an outer diameter 68 of the ballscrew 42. The paths may form ball circuits, tracks, or a ball race with corresponding paths that are formed on components that are concentrically arranged relative to the ballnut (not shown). For example, the inner diameter 66 and the linear bearing shaft 56 may define a first or internal ball race, and the plurality of ball members may be incorporated between the linear bearing shaft 56 and the ballscrew 42 for transferring linear movement of the linear bearing shaft 56 to rotational movement of the ballnut. Using a plurality of ball circuits that have different starting and ending locations may be advantageous in that the travel paths of the ball members may be isolated and independent from another. Thus, failure of one ball circuit may not affect the other ball circuits. Failure of a ball circuit may occur, for example, due to jamming.

In an exemplary embodiment of the ballscrew 42, as shown in FIG. 5, a plurality of linear or axially extending ball paths 70 may be defined on the inner diameter 66 of the ballscrew 42. The plurality of linear ball paths 70 may include loaded paths 72 and unloaded paths 74 for travel of the ball members. During operation of the actuator, the ball members may be driven along the loaded paths 72 by the hydraulically actuatable linear input mechanism 48. The loaded paths 72 and the unloaded paths 74 may be adjacent to one another and may extend parallel to one another. The loaded paths 72 and the unloaded paths 74 may be spaced apart and may alternate such that a loaded path is positioned between two unloaded paths and an unloaded path is positioned between loaded two paths. The unloaded paths 74 may be located at a radial distance relative to the central axis that is equal to a radial distance at which the loaded paths 72 are located relative to the actuator centerline. The unloaded paths 74 may allow the ball members to travel in an opposite direction relative to the direction of travel along the loaded paths 72.

A plurality of helical ball paths 76 may be defined on the outer diameter 68 of the ballscrew 42. The helical ball paths 76 may also include loaded paths 78 and unloaded paths 80 for travel of the ball members, such that the ball members may be driven along the loaded paths 72, 78 of the ballscrew 42 for converting linear motion from the input mechanism to rotary motion of the output assembly 46. The loaded paths 78 and the unloaded paths 80 may be adjacent to one another and may extend parallel to one another. The loaded paths 78 and the unloaded paths 80 may be spaced and may alternate such that a loaded path is positioned between two unloaded paths and an unloaded path is positioned between loaded two paths. The unloaded paths 80 may be located at a radial distance relative to the central axis that is equal to a radial distance at which the loaded paths 78 are located relative to the central axis. The unloaded paths 80 may allow the ball members to travel in an opposite direction relative to the direction of travel along the loaded paths 78.

Figure 6:
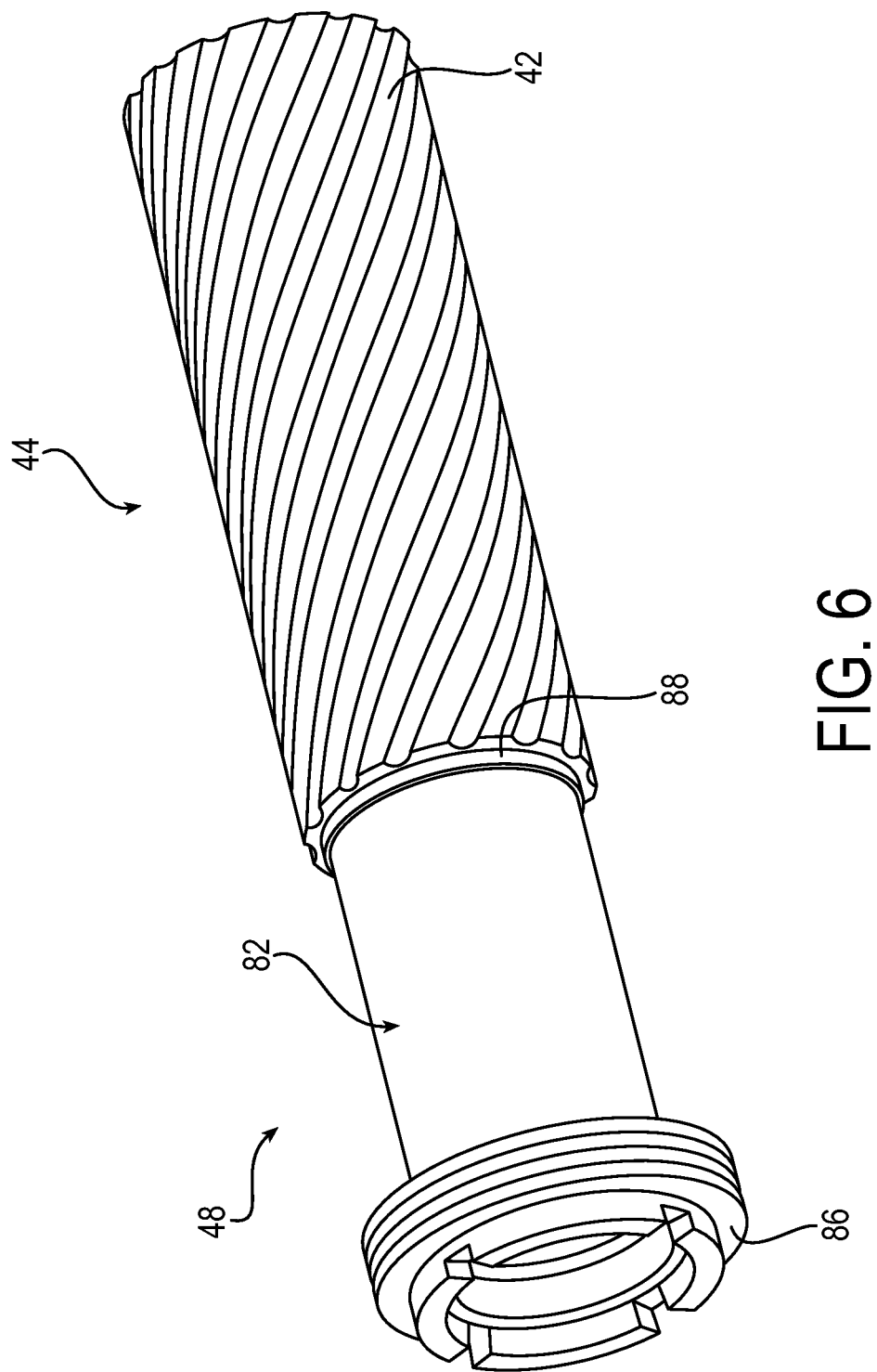
FIG. 6 shows the ballscrew of FIG. 5 coupled to a hydraulic piston.

As best shown in FIG. 6, the ballscrew 42 may be secured to the linear input mechanism 48. The linear input mechanism 48 may be any suitable device for providing linear motion to the rotary hydraulic actuator. The linear input mechanism 48 may include a hydraulic piston 82. The hydraulic piston 82 may include a hydraulic cylinder containing a piston and a piston rod that are axially moveable through the hydraulic cylinder for driving the ballscrew 42. The hydraulic piston 82 may be constrained to linear motion. The piston 82 may include a first end 86 and a second end 88 distally opposite the first end 86. The first end 86 may be mounted within the housing 54 of the actuator 40 (shown in FIG. 2). The second end 88 of the hydraulic piston 82 may be coupled or secured to the ballscrew 42. The second end 88 and the ballscrew 42 may be secured in any suitable manner. For example, the ballscrew 42 may be threaded or pinned to the hydraulic piston 82. Forming the ballscrew 42 and the hydraulic piston 82 as an integral component may be advantageous for enabling self-contained rotary output actuation of the rotary hydraulic actuator.

Figure 7:
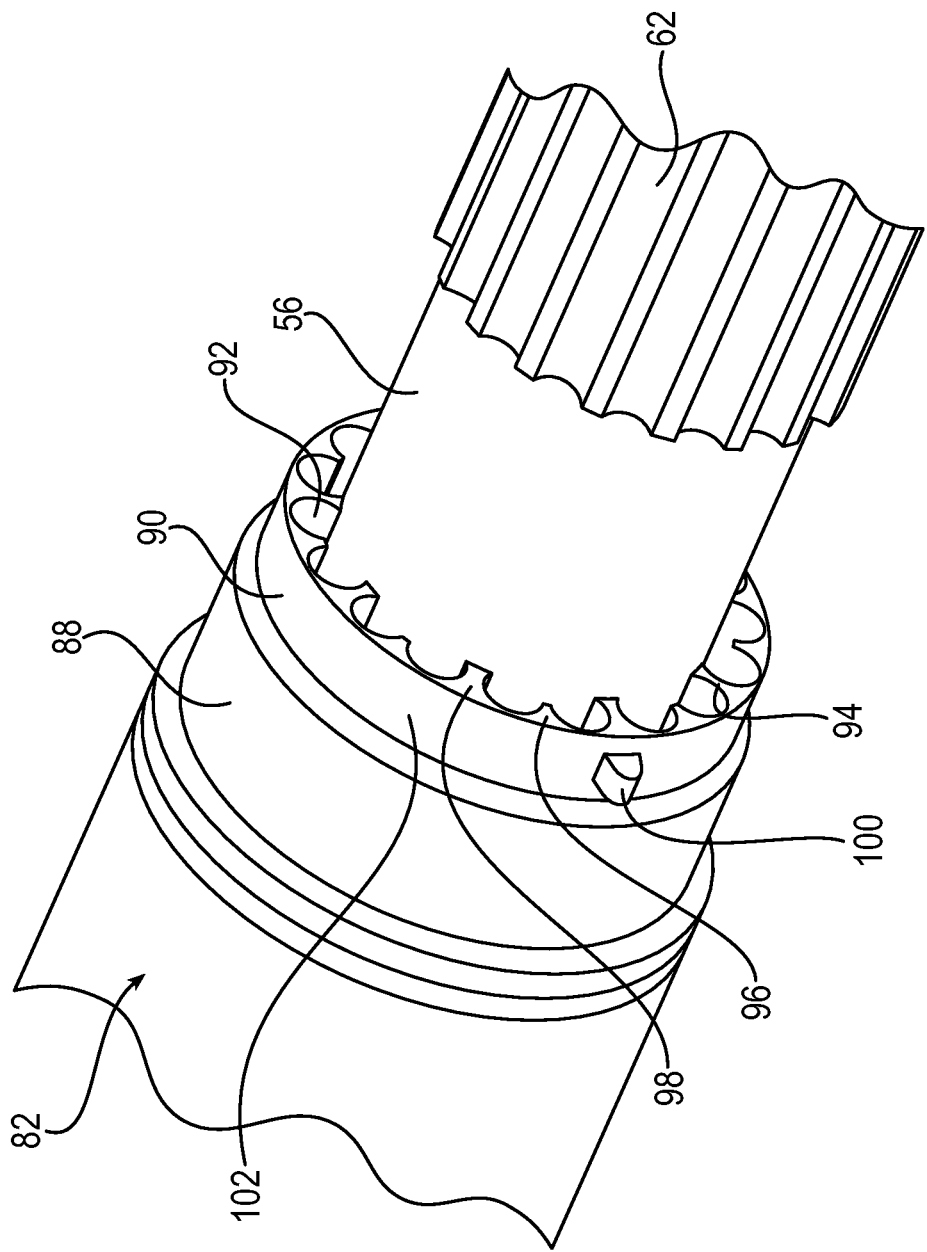
FIG. 7 is an assembly view of a ball return mechanism of the actuator according to a first embodiment.

Referring in addition to FIG. 7, a ball return structure or mechanism 90 may be provided at the second end 88 of the piston 82 and arranged adjacent to the ballscrew 42. The ball return mechanism 90 may be configured to receive and transfer the plurality of ball members between the unloaded tracks and the loaded tracks of at least one of the linear ball baths or the helical ball paths. As shown in the exemplary ball return structure 90 of FIG. 7, the ball return mechanism 90 may be arranged along the actuator centerline and concentrically surround at least a portion of the linear bearing shaft 56 and the splined portion 62 of the linear bearing shaft 56. The ball return mechanism 90 may be a cylindrical or ring-shaped body. The ball return mechanism 90 may be axially aligned and adjacent to the linear ball paths formed on the interior diameter of the ballscrew 42. The ball return mechanism 90 may include a plurality of grooves 92 disposed about the diameter of the ball return mechanism 90. The plurality of grooves 92 may be separated by a plurality of septum portions 94 formed on the ball return mechanism 90. The plurality of grooves 92 may be located at a radial distance relative to the central axis that is approximately equal to a radial distance at which the loaded and unloaded paths of the linear ball paths are located relative to the actuator centerline.

The septum portions 94 of the ball return mechanism 90 may include shallow septum portions 96 and thick septum portions 98. The ball members of the loaded paths 72 and the unloaded paths 74 may engage or hit the shallow septum portions 96 such that the ball members are forced towards the thicker septum portions 98. The thicker septum portions 98 may receive the ball members from one of the loaded paths 72 and return the ball members to a corresponding one of the unloaded paths 74 via the grooves 92. The ball return mechanism 90 may further include a fastening mechanism for securing the ball return mechanism 90 to the ballscrew 42 (shown in FIG. 5). For example, at least one notch 100 or other protrusion may be disposed on an outer diameter 102 of the ball return mechanism 90. A plurality of notches may be provided. The notch 100 may be engageable in a corresponding slot 104 formed on the inner diameter 66 of the ballscrew 42 (shown in FIG. 5).

Figure 8:
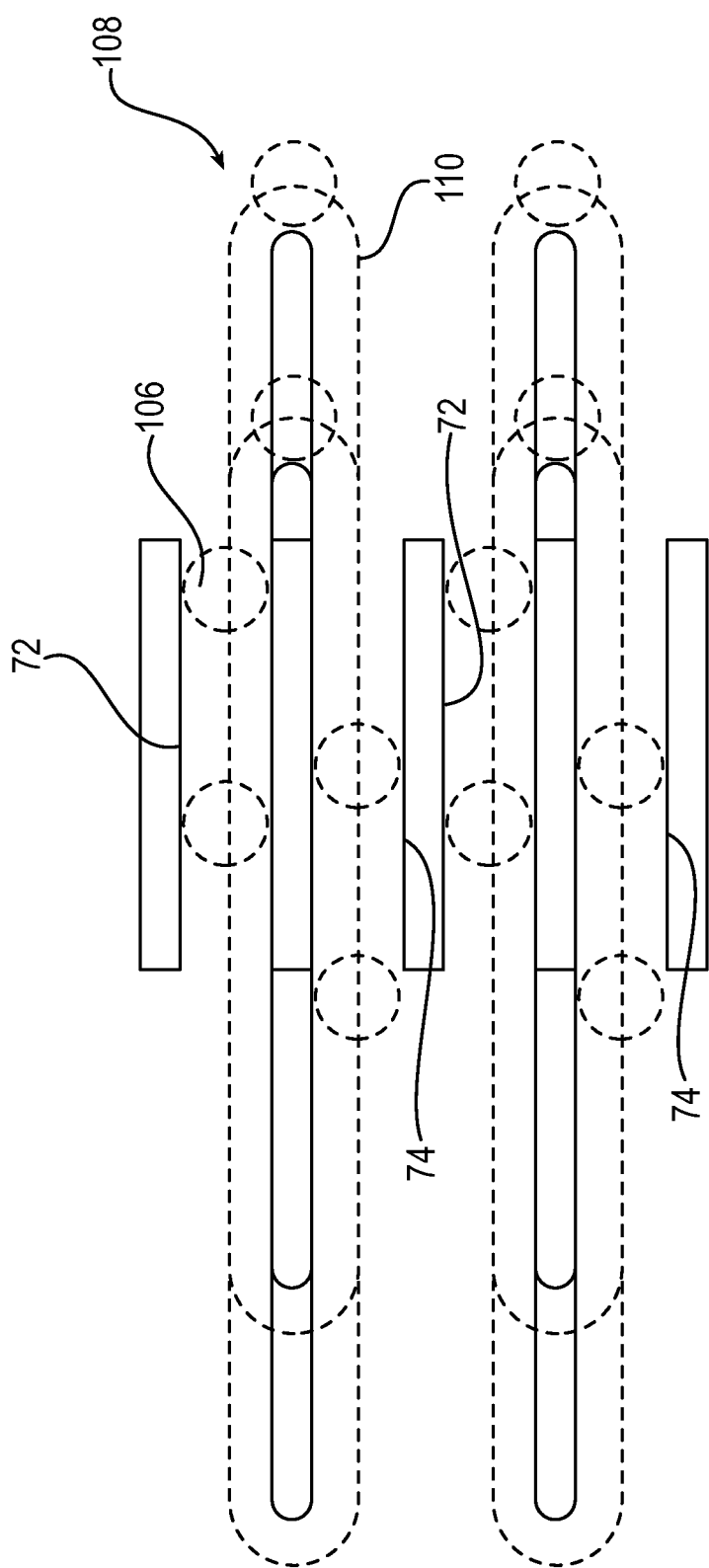
FIG. 8 is a schematic drawing showing a ball travel path within the actuator having the ball return mechanism of FIG. 7.

The path of travel of the ball members 106 through the actuator is schematically shown in FIG. 8. During operation of the rotary hydraulic actuator, the grooves 92 of the ball return mechanism 90 (as shown in FIG. 7) may guide the ball members 106 between the loaded paths 72 of the linear ballscrew paths and the unloaded paths 74 of the linear ballscrew paths. Using the ball return mechanism 90 may enable each of the ball members 106 to make a u-turn 108 at an end 110 of the linear ballnut path. Using the ball return mechanism having a u-turn structure is advantageous in that the structure enables the unloaded paths 74 to be located at the same radial distance from the actuator centerline as the loaded paths 72, such that the ball return mechanism enables "at-level" ball returning. The arrangement of the paths 72, 74 utilizes the length of the actuator without increasing the overall diameter, such that the actuator may be more compact as compared with conventional ball return structures.

Figure 9:
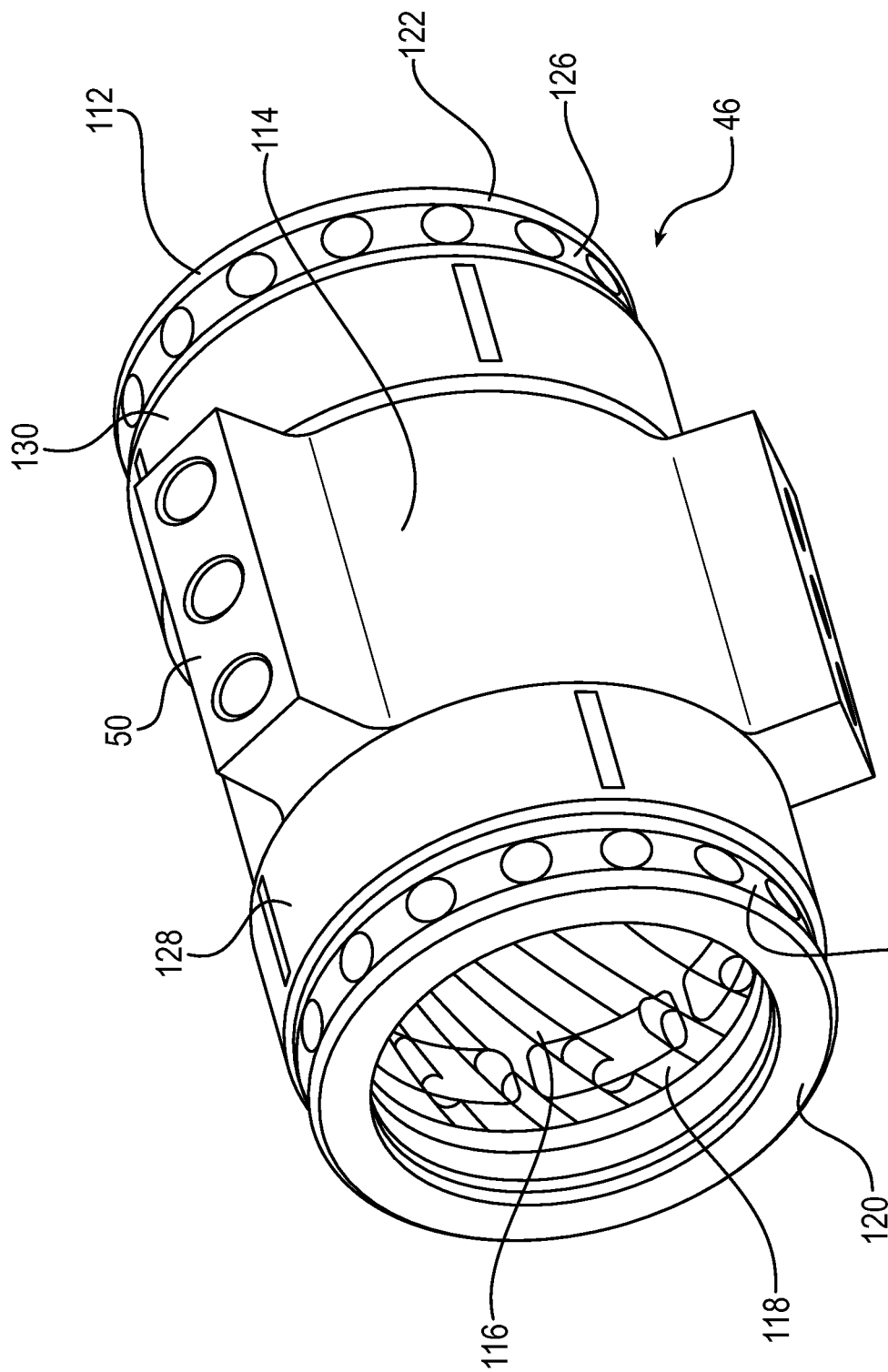
FIG. 9 is an assembly view of an output mechanism of the actuator according to a first embodiment.

Referring now to FIG. 9, the output assembly 46 may include an output mechanism or ballnut 112. An exemplary output mechanism 112 is shown in FIG. 9. The output mechanism 112 may include a ballnut that is concentrically arranged around the ballscrew 42 (shown in FIG. 5). The ballnut 112 may include at least one mounting feature 50 (as also shown in FIG. 2). The mounting feature 50 may be a protrusion or a plurality of protrusions disposed on an external diameter 114 of the ballnut 112. The ballnut 112 may include a plurality of helical paths 116 defined on an inner diameter 118 of the ballnut 112. The helical paths 116 may correspond to the helical paths 76 formed on the ballscrew (shown in FIG. 5). The helical paths 76 of the ballscrew and the helical paths 116 may form a second or external ball race that is concentrically arranged around the first ball race formed between the linear paths 70 of the ballscrew 42 and the splined portion 62 of the linear bearing shaft 56. Arranging the ball races in an overlapping orientation may be advantageous for reducing an overall end-to-end length of the actuator.

The output mechanism or ballnut 112 may extend axially between a first end 120 and a second end 122. The output assembly 46 may include a plurality of thrust bearings 124, 126 where a first thrust bearing 124 is located at the first end 120 and a second thrust bearing 126 is located at the second end 122. The output assembly 46 may include a plurality of radial bearings 128, 130 that are located adjacent to the plurality of thrust bearings 124, 126. The thrust and radial bearings may be cylindrical in shape. In an exemplary embodiment, a first radial bearing 128 may be located at the first end 120 of the ballnut 112 and adjacent the first thrust bearing 124. A second radial bearing 130 may be located at the second end 122 of the ballnut 112 and adjacent the second thrust bearing 126. The thrust bearings 124, 126 may be the axially outermost bearings of the ballnut 112. As the ball members (not shown) travel along the second ball race, or helical ball race, defined between the ballscrew 42 and the ballnut 112, the output assembly 46 may be rotatable. The thrust bearings 124, 126 and the radial bearings 130, 132 may constrain the output assembly 46 from linear motion and enable the output assembly 46 to output rotary motion. The inner diameter 118 of the ballnut 112 may allow the ball members to travel between the loaded helical paths 78 of the ballscrew 42 and the unloaded helical paths 80 of the ballscrew 42 by way of the ball members being guided along the outer diameter 68 of the ballscrew 42 (as shown in FIG. 5). The ball members may crossover the outer diameter 68 between the paths.

Second exemplary embodiments of components that may be implemented in the rotary hydraulic actuator 140 are shown in FIGS. 10-14. All of the embodiments disclosed herein pertain to a rotary hydraulic actuator that is configured to output rotary motion using a linear hydraulic actuator, nested ballscrew, ballnut, and output assembly that converts linear motion and force to rotary motion and torque. All of the embodiments include using concentric ball races that are arranged between the ballscrew and the output assembly, where one of the ball races is helical and one of the ball races is linear. The concentric ball races may be used to convert the linear motion of the linear actuator to rotary motion of the output assembly that may be connected to the hinged aircraft surface.

A second exemplary embodiment of the rotary hydraulic actuator 140 may include a ballnut with linear ball paths on the internal diameter and helical ball paths on the external diameter, as in the first exemplary embodiment of the rotary hydraulic actuator. The second exemplary embodiment of the rotary actuator 140 may include ball return paths where the ball members cross-over a ball return structure between the loaded paths and the unloaded baths for both the linear ball paths and the helical ball paths, as compared with the first exemplary embodiment of the rotary hydraulic actuator where the ball return structure for the linear ball paths enables the ball members to move between the linear ball paths at the same radial distance from the actuator centerline as the linear ball paths.

Figure 10:
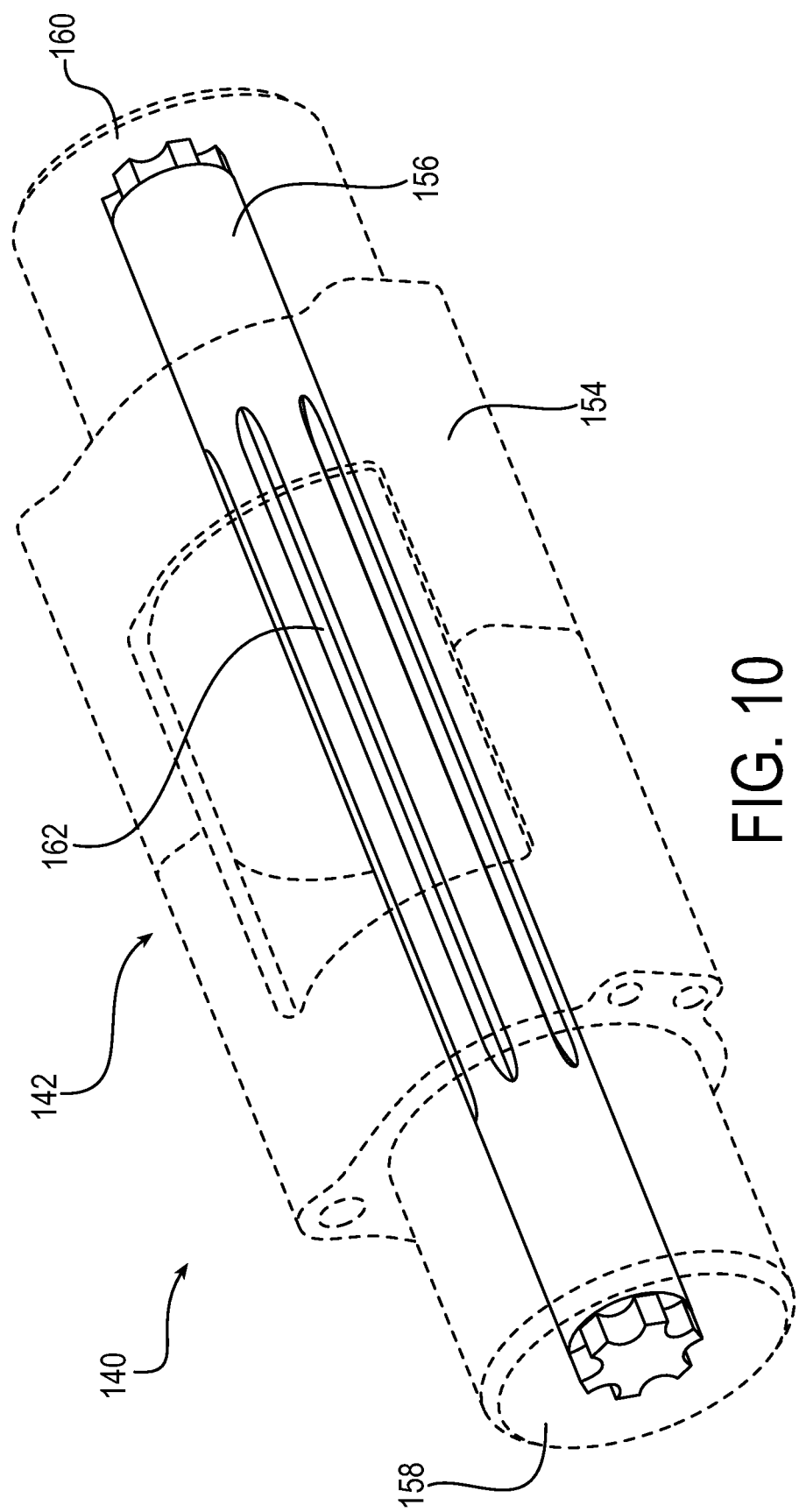
FIG. 10 is a transparency view of a ballscrew shaft of the actuator according to a second embodiment.

The rotary hydraulic actuator 140 may include a second exemplary embodiment of the ballscrew assembly 142 as shown in FIG. 10. The ballscrew assembly 142 may include a ballspline shaft. The ballscrew shaft may be in the form of a linear bearing shaft 156 that circumscribes the central axis of the rotary hydraulic actuator. The linear bearing shaft 156 may extend between a first end 158 and a second end 160 of the housing 154. The linear bearing shaft 156 may be fixedly mounted at the first end 158 and the second end 160. The linear bearing shaft 156 may include a grooved portion 162 where the grooves extend longitudinally in a direction parallel to the actuator centerline. The grooved portion 162 may receive the plurality of ball members and enable travel of the ball members. The ballscrew assembly 142 may include two hydraulic cylinders as schematically shown in FIG. 10.

Figure 11:
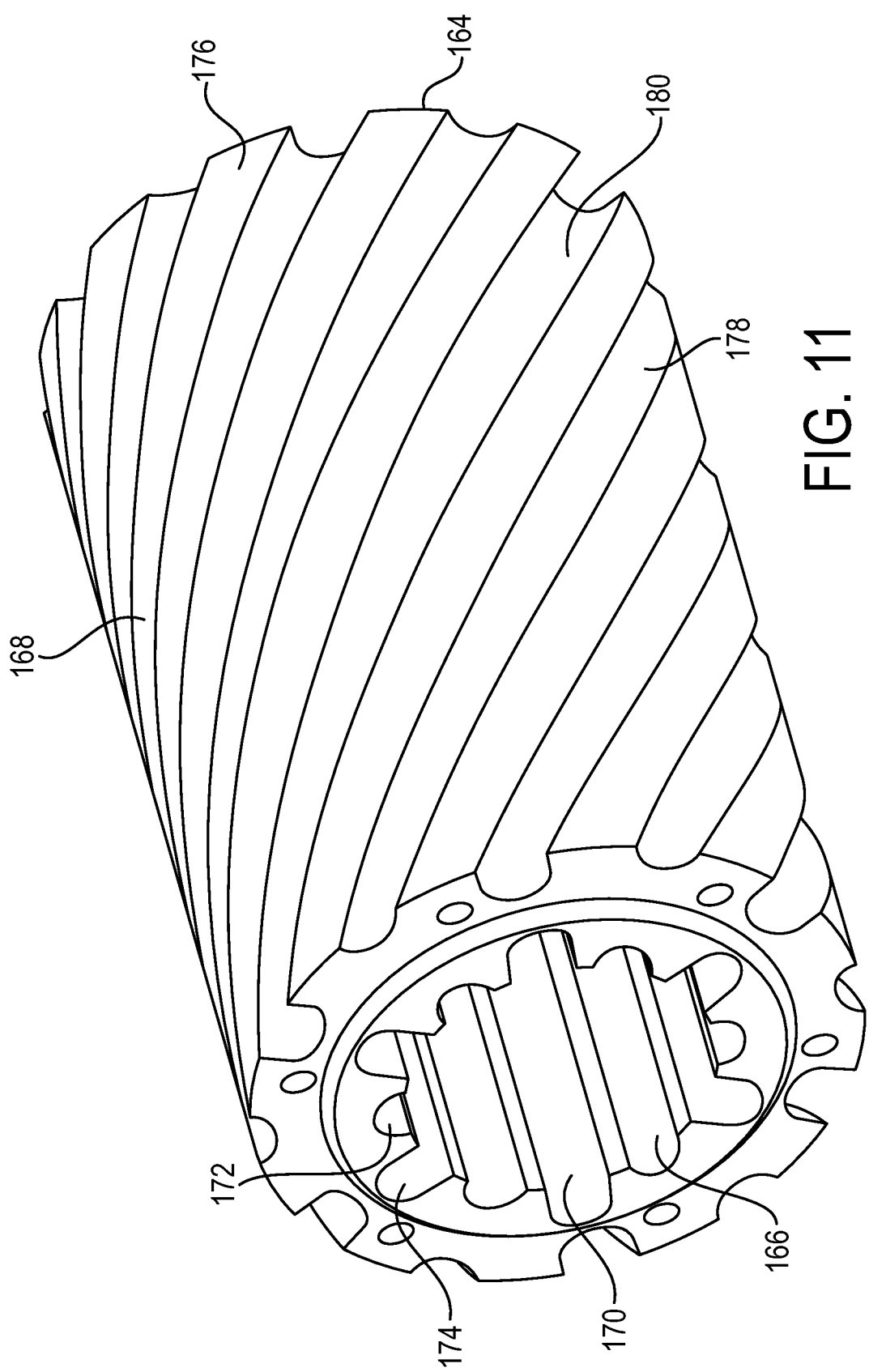
FIG. 11 shows a ballscrew of the actuator according to a second embodiment.

Referring in addition to FIG. 11, a second exemplary embodiment of the ballscrew is shown. The ballscrew 164 may extend along the central axis and concentrically surround the linear bearing shaft 156. A plurality of paths for receiving the plurality of ball members may be formed on an inner diameter 166 and an outer diameter 168 of the ballscrew 164. The paths may form ball circuits, tracks, or races with another component having a corresponding path that is arranged concentrically with the ballscrew 164. For example, the inner diameter 166 of the ballscrew 164 and the grooved portion 162 of the linear bearing shaft 156 may form a first ball race and the plurality of ball members may be incorporated between the linear bearing shaft 156 and the ballscrew 164 preventing rotation of the ballscrew thus forcing rotational movement of the ballnut (not shown in FIG. 11).

A plurality of linear or axially extending ball paths 170 may be defined on the inner diameter 166 of the ballscrew 164. The plurality of linear ball paths 170 may include loaded paths 172 and unloaded paths 174 that are adjacent to one another and may extend parallel to one another. The unloaded paths 174 may have a greater depth relative to the loaded paths 172. A plurality of helical ball paths 176 may be defined on the outer diameter 168 of the ballscrew 164. The helical ball paths 176 may include loaded paths 178 and unloaded paths 180 that are adjacent to one another and may extend parallel to one another. The unloaded paths 180 may have a greater depth relative to the loaded paths 178.

Figure 12:
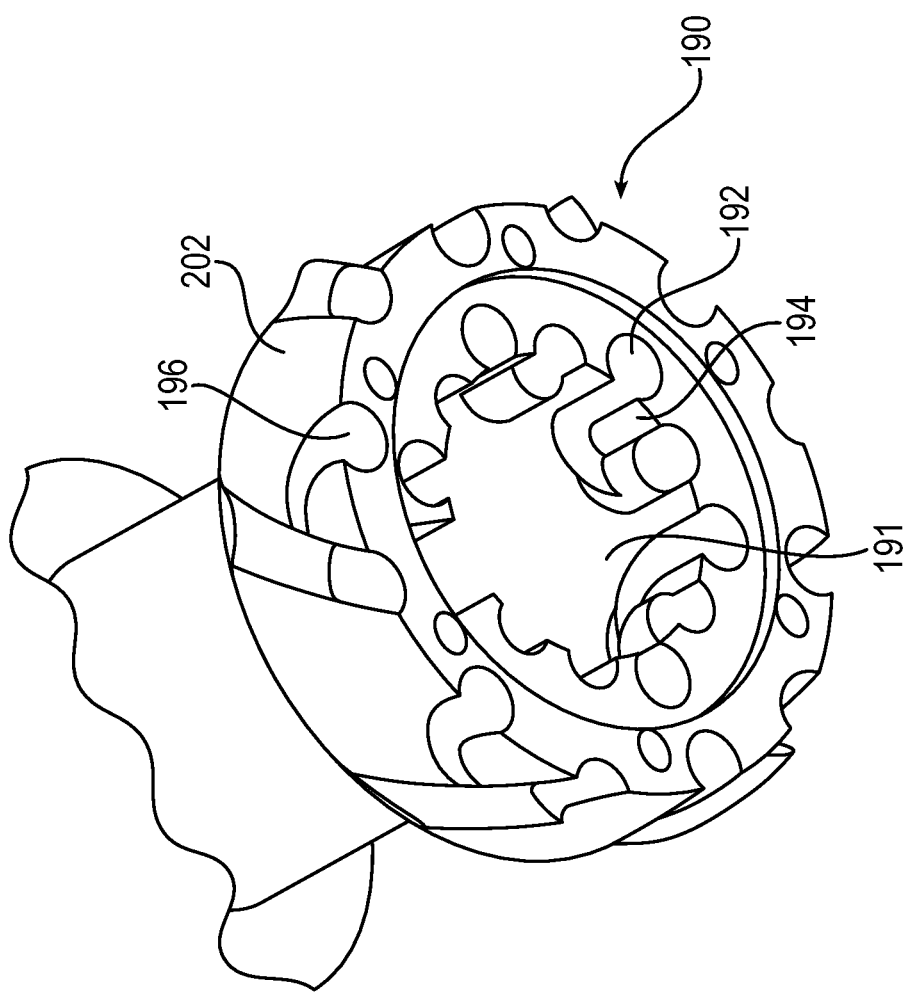
FIG. 12 is a sectional view of a ball return mechanism of the actuator according to a second embodiment.

Referring in addition to FIG. 12, a second exemplary embodiment of the ball return mechanism 190 is shown. The ball return mechanism 190 may be arranged along the central axis and adjacent to the ballscrew 164, such that the ball return mechanism 190 may receive the ball members from the ball races. The ball return mechanism 190 may include a cylindrical-shaped structure and have a plurality of grooves formed on the structure. The ball return mechanism 190 may include an inner diameter 191 having a plurality of grooves 192 separated by a plurality of septum portions 194. The grooves 192 and the septum portions 194 may be engageable with the linear ball paths 170 (as shown in FIG. 11) enabling the ball members to cross-over the ball return mechanism 190 between the loaded paths 172 of the linear ball paths 170 and the unloaded paths 174 of the linear ball paths 170. The ball return mechanism 190 may include a plurality of grooves 196 disposed on an outer diameter 202 of the ball return mechanism 190. The plurality of grooves 196 may be engageable with the helical ball paths 176 (as shown in FIG. 11) enabling the ball members to cross-over the ball return mechanism 190 between the loaded paths 178 of the helical ball paths 176 and the unloaded paths 180 of the helical ball paths 176.

Figure 13:
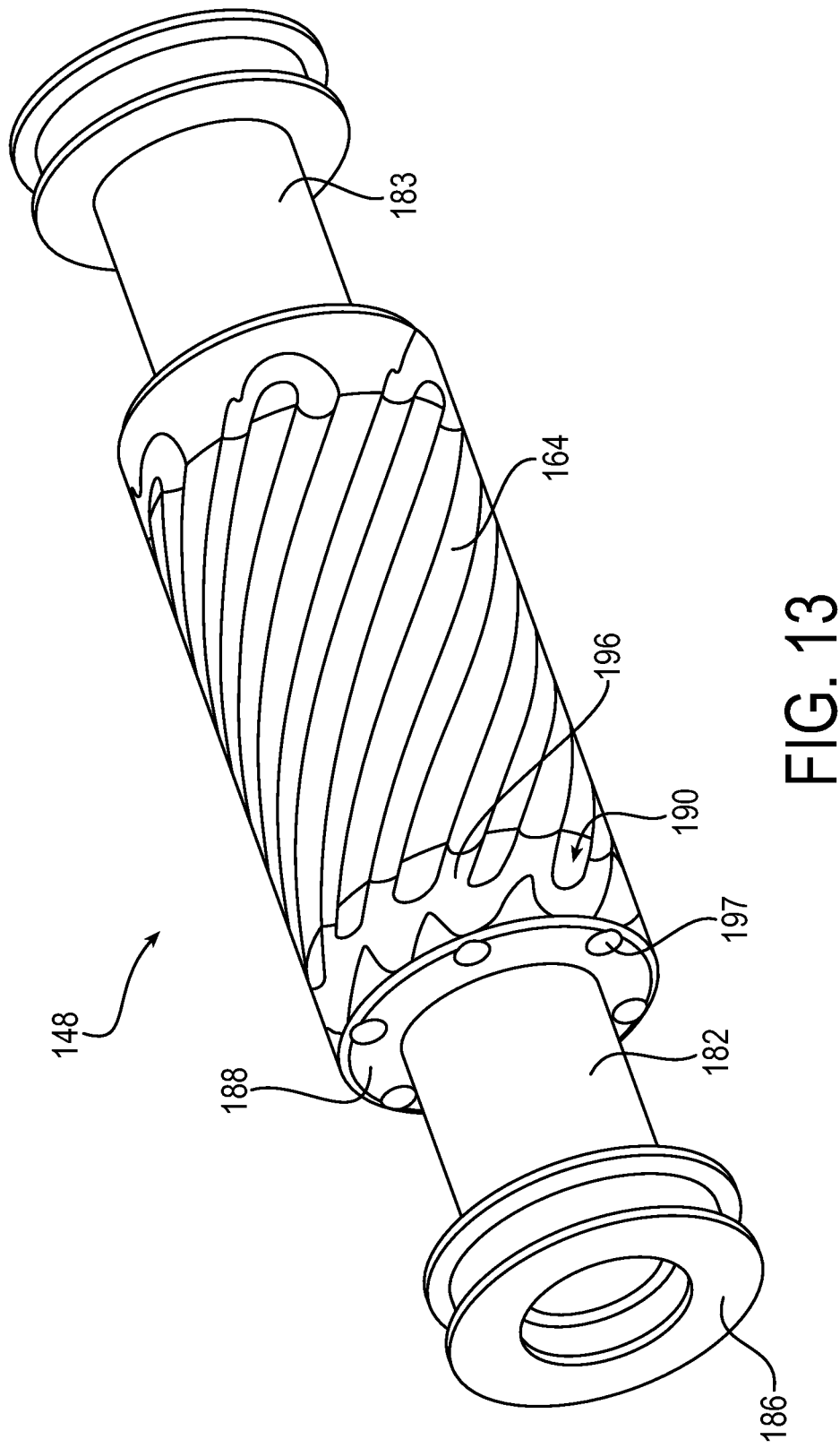
FIG. 13 is a transparency view of the ballnut of FIG. 11 showing a plurality of hydraulic pistons.

Referring in addition to FIG. 13, a second exemplary embodiment of the linear input mechanism 148 is shown. The ballscrew 164 may be adjacently arranged and secured to the linear input mechanism 148. The linear input mechanism 148 may include at least one hydraulic piston 182. The linear input mechanism 148 may include a plurality of hydraulic pistons 182, 183 and the linear input mechanism 148 may have a dual piston configuration. The ballscrew 164 may be interposed between the hydraulic pistons 182, 183. Each of the hydraulic pistons 182, 183 may include a hydraulic cylinder containing a piston and a piston rod that are axially moveable through the hydraulic cylinder for driving the ballscrew 164. The hydraulic pistons 182, 183 may be arranged in a push-push configuration such that the piston rods of the hydraulic pistons 182, 183 may move in opposing axial directions, such as towards the ballscrew 164. In another possible configuration, the hydraulic pistons 182, 183 may be arranged in a push-pull configuration such that the piston rods of the hydraulic pistons 182, 183 may move in the same axial direction. Using dual hydraulic pistons in the linear actuator may be advantageous for doubling the hydraulic power of the actuator.

The hydraulic pistons 182, 182 may be constrained to linear motion. The piston 182 may include a first end 186 and a second end 188 distally opposite the first end 186. The first end 186 may be mounted within the housing 154 of the rotary hydraulic actuator (as shown in FIG. 2). The second end 188 of each of the hydraulic pistons 182, 183 may be coupled or secured to the ballscrew 164. The second end 188 and the ballscrew 164 may be secured in any suitable manner. For example, the ballscrew 164 may be threaded or pinned to each of the hydraulic pistons 182, 183. The ball return mechanism 190 may be secured to the second end 188 of the hydraulic piston 182 via a fastening mechanism 197. For example, the ball return mechanism 190 may be bolted or pinned to the hydraulic piston 182 such that the ball members traveling along the outer diameter of the ballscrew 164 may cross-over the structure of the ball return mechanism 190 to move between the loaded and unloaded paths via the grooves 196 of the ball return mechanism 190.

Figure 14:
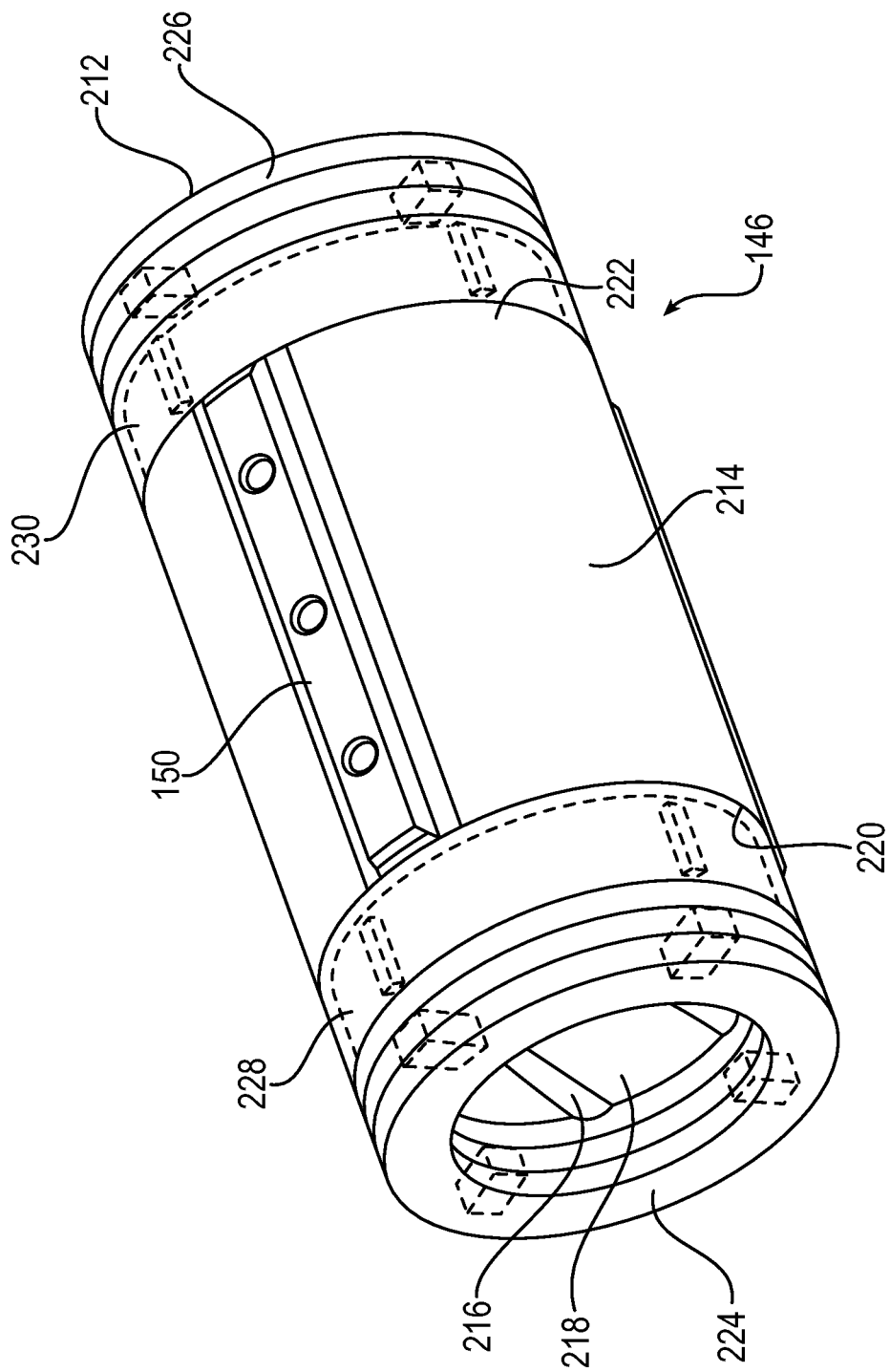
FIG. 14 is an output mechanism assembly of the actuator according to a second embodiment.

Referring now to FIG. 14, a second exemplary embodiment of the output assembly 146 is shown. The output assembly 146 may include an output mechanism such as a ballnut 212. The ballnut 212 may be a cylindrical sleeve that is concentrically arranged around the ballscrew 164 (shown in FIG. 11). The ballnut 212 may include at least one mounting feature 150 for engaging the control surface of the aircraft. The mounting feature 150 may be a protrusion or a plurality of protrusions disposed on an external diameter 214 of the ballnut 212. The output mechanism 212 may include a plurality of helical paths 216 defined on an inner diameter 218 of the ballnut 212. The helical paths 216 may correspond to the helical paths 176 on the external diameter of the ballscrew 164 (shown in FIG. 11). The helical paths 176 of the ballscrew 164 and the helical paths 216 of the ballnut 212 may form a second ball race that is concentrically arranged around the first ball race formed between the linear paths 170 of the ballscrew 164 and the grooved portion 162 of the linear bearing shaft 156 (shown in FIG. 10).

The ballnut 212 may extend axially between a first end 220 and a second end 222. The output assembly 146 may include a plurality of thrust bearings 224, 226 where a first thrust bearing 224 is located at the first end 220 and a second thrust bearing 226 is located at the second end 222. The output assembly 146 may include a plurality of radial bearings 228, 230 that are located adjacent to the plurality of thrust bearings 224, 226. The thrust and radial bearings may be cylindrical in shape. In an exemplary embodiment, a first radial bearing 228 may be located at the first end 220 of the ballnut 212 and adjacent the first thrust bearing 224. A second radial bearing 230 may be located at the second end 222 of the ballnut 212 and adjacent the second thrust bearing 226. The thrust bearings 224, 226 may be the axially outermost bearings of the ballnut 212. As the ball members (not shown) travel along the second ball race, or the helical ball race, defined between the ballscrew 164 and the ballnut 212, the output assembly 146 may be rotatable. The thrust bearings 224, 226 and the radial bearings 230, 232 may constrain the output assembly 146 from linear motion and enable the output assembly 146 to output rotary motion. The dual hydraulic pistons 182, 183 may be received through the thrust bearings 224, 226 and the radial bearings 230, 232.

Figure 15:
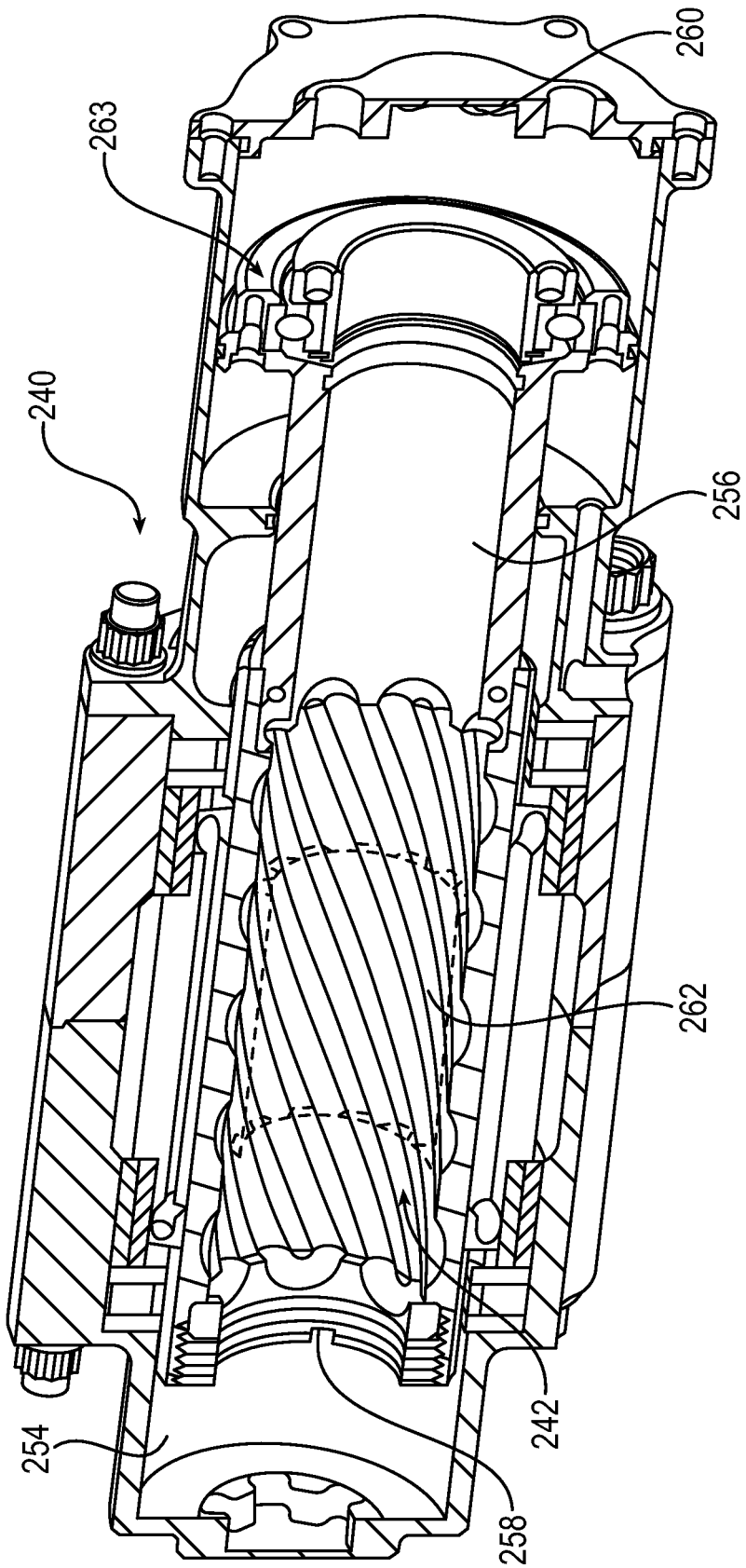
FIG. 15 is a sectional view of the rotary hydraulic actuator according to another embodiment.
Figure 16:
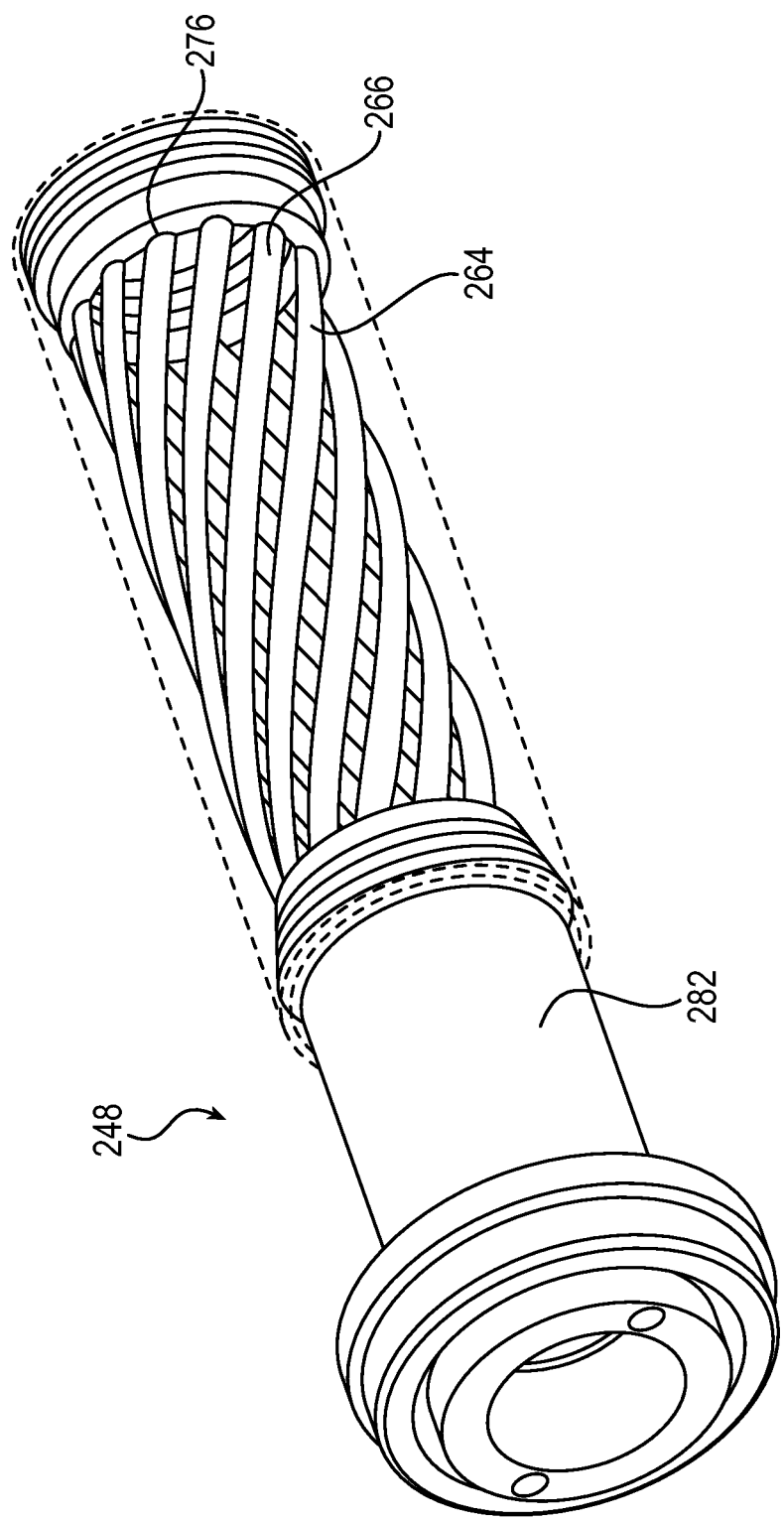
FIG. 16 shows a ballscrew and a hydraulic piston assembly of the actuator according to a third embodiment.
Figure 17:
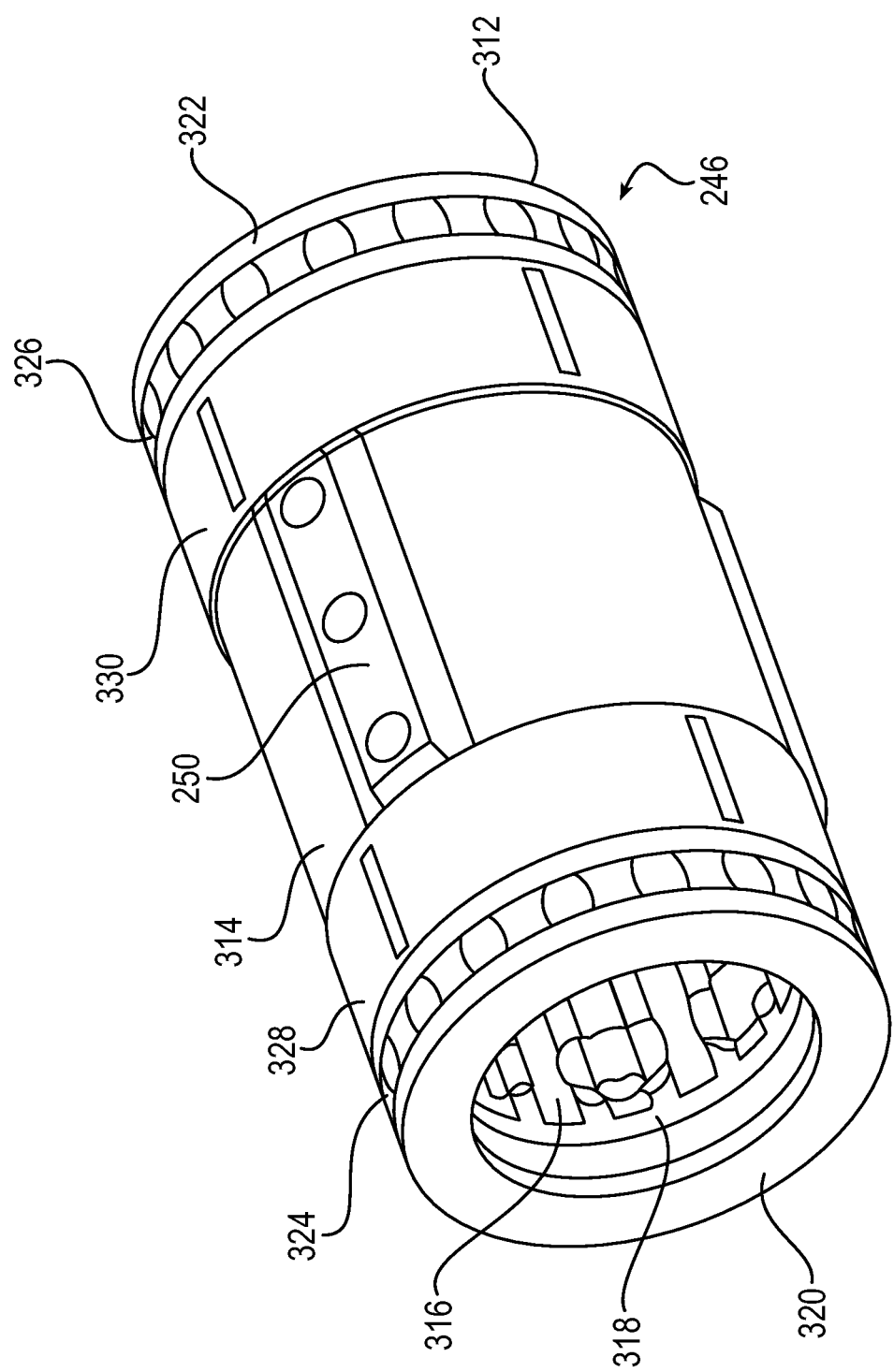
FIG. 17 shows an output assembly mechanism of the actuator according to a third embodiment.

A third exemplary embodiment of the rotary hydraulic actuator 240 is shown in FIGS. 15-17. The third exemplary embodiment of the rotary hydraulic actuator 240 may include an internal ball race that is helical and an external ball race that is linear, as compared with the first and second exemplary embodiments of the rotary hydraulic actuator where the internal ball race may be linear and the external ball race may be helical. The rotary hydraulic actuator 240 may include a third exemplary embodiment of the ballscrew 242 as shown in FIG. 15. The ballscrew 242 may include a ballscrew shaft 256. The ballscrew shaft 256 may circumscribe the central axis or the centerline of the rotary hydraulic actuator 240. The ballscrew shaft 256 may extend between a first end 258 and a second end 260 of the housing 254. The ballscrew shaft 256 may be fixedly mounted at the first end 258 and the second end 260. The ballscrew shaft 256 may include a helical portion 262 formed on the ballscrew shaft 256 where the grooves extend longitudinally along the central axis for receiving the plurality of ball members and allowing travel of the ball members along the helical grooves. The housing 254 may include a hydraulic cylinder 263.

Referring in addition to FIG. 16, a third exemplary embodiment of the ballscrew assembly is shown. The ballscrew 264 may extend along the actuator centerline and concentrically surround the ballscrew shaft 256 (as shown in FIG. 15). A plurality of paths for receiving the plurality of ball members may be formed on an inner diameter and an outer diameter of the ballscrew 264. The paths may form ball circuits, tracks, or races with paths formed on components that are concentrically arranged relative to the ballscrew 264. The inner diameter of the ballscrew 264 and the ballscrew shaft 256 may form a first ball race 266 that may be helical. The ballscrew 264 may be secured to the linear input mechanism 248. The linear input mechanism 248 may be any suitable device for providing linear motion to the rotary hydraulic actuator, such as a hydraulic piston 282. The hydraulic piston 282 may be constrained to linear motion (and rotary motion due to the ball tracks of 266) and the hydraulic piston 282 may be coupled to or secured to the ballscrew 264. The ballscrew 264 may be threaded or pinned to the hydraulic piston 282. The assembly may include a linear ballspline 276 on an outer diameter of the ballscrew 264 for transferring hydraulic linear motion of the hydraulic piston 282 to rotational movement. The ballnut is rotating and translating and the ballsplines uncouple the translation so that only rotation is left for the coupled part.

Referring in addition to FIG. 17, a third exemplary embodiment of the output assembly 246 is shown. The output assembly 246 may include an output mechanism 312 or a ballnut. The output mechanism 312 may be a cylindrical sleeve that is concentrically arranged around the ballscrew 264 (shown in FIG. 16). The output mechanism 312 may include at least one mounting feature 250 for engaging the control surface of the aircraft. The mounting feature 250 may be a protrusion or a plurality of protrusions disposed on an external diameter 314 of the output mechanism 312. The output mechanism 312 may include a linear ballspline 316 defined on an inner diameter 318 of the output mechanism 312. The linear ballspline 316 may correspond to the linear ballspline 276 of the ballscrew 264 (shown in FIG. 16). The linear ballsplines 276, 316 may form a second ball race that is concentrically arranged around the first ball race 264 (shown in FIG. 16).

The output mechanism 312 may extend axially between a first end 320 and a second end 322. The output assembly 246 may include a plurality of thrust bearings 324, 326 where a first thrust bearing 324 is located at the first end 320 and a second thrust bearing 326 is located at the second end 322. The output assembly 246 may include a plurality of radial bearings 328, 330 that are located adjacent to the plurality of thrust bearings 324, 326. The thrust and radial bearings may be cylindrical in shape. In an exemplary embodiment, a first radial bearing 328 may be located at the first end 320 of the output mechanism 312 and adjacent the first thrust bearing 324. A second radial bearing 330 may be located at the second end 322 of the output mechanism 312 and adjacent the second thrust bearing 326. The thrust bearings 324, 326 may be the axially outermost bearings of the output mechanism 312. As the ball members (not shown) travel along the second ball race, or the linear ballsplines, defined between the ballscrew 264 and the output mechanism 312, the output assembly 246 may be rotatable. The thrust bearings 324, 326 and the radial bearings 230, 232 may constrain the output assembly 246 from linear motion and enable the output assembly 246 to output rotary motion. The hydraulic piston 282 may be received through at least one of the thrust bearings 324, 326 and the radial bearings 330, 332.

Any components of the embodiments described herein may be combined or used to form different configurations of the rotary hydraulic actuator. For example, the third exemplary embodiment of the rotary hydraulic actuator that includes an internal helical ball race and an external linear ball race may implement a ball return structure as described with regards to the first or second embodiment of the rotary hydraulic actuator where the internal ball race is linear and the external ball race is helical. In still another example, although the dual piston configuration was described with regards to the second exemplary embodiment of the actuator, a dual piston configuration may be implemented in the first or third exemplary embodiments, or any other configuration of the actuator.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A rotary hydraulic actuator comprising:
    a ballscrew mechanism driven by a linear input mechanism, the ballscrew mechanism having a nested ballscrew arranged along a central axis;
    a linear ball race extending along the central axis and having a plurality of linear loaded track portions and a plurality of linear unloaded track portions that are parallel and adjacent the linear loaded track portions in an alternating arrangement, the plurality of linear loaded track portions and the plurality of linear unloaded track portions defining a linear ballnut path axially extending along the ballscrew mechanism;
    a helically inclined ball race extending along the central axis and having a plurality of helical loaded track portions and a plurality of helical unloaded track portions that are parallel and adjacent the helical loaded track portion in an alternating arrangement, wherein one of the linear ball race and helically inclined ball race is concentrically arranged relative to the other and radially surrounds the other;
    a ball return for the linear ball race defining a ball return path located at a radial distance from the central axis that is equal to a radial distance from the central axis at which the plurality of linear loaded track portion is located, wherein the ball return is arranged at an axial end of the linear ballnut path; and
    a rotary output mechanism concentrically surrounding the ballscrew mechanism, the rotary output mechanism having at least one bearing preventing linear movement of the rotary output mechanism,
    wherein the linear ball race and the helically inclined ball race are at least partly formed by the ballscrew mechanism and are radially arranged between the ballscrew mechanism and the rotary output mechanism for converting linear movement from the linear input mechanism to rotary movement of the rotary output mechanism.

2. The rotary hydraulic actuator of claim 1, wherein the linear unloaded track portions of the linear ball race are located at a radial distance relative to the central axis that is equal to a radial distance at which the linear loaded track portions of the linear ball race are located relative to the central axis.

3. The rotary hydraulic actuator of claim 1, wherein each of the linear loaded track portions is isolated from each of the linear unloaded track portions and each of the helical loaded track portions is isolated from each of the helical unloaded track portions.

4. The rotary hydraulic actuator of claim 1, wherein the ball return path is u-shaped.

5. The rotary hydraulic actuator of claim 1, wherein the output mechanism includes a ballnut, the linear ball race being located between the ballspline and the ballscrew, and the helical ball race being located between the ballscrew and the ballnut.

6. The rotary hydraulic actuator of claim 1, wherein the output mechanism includes a ballnut, the linear ball race being located between the ballnut and the rotary output mechanism and the helical ball race being located between the ballscrew and the ballnut.

7. The rotary hydraulic actuator of claim 1, wherein the linear ball race includes a ballspline.

8. The rotary hydraulic actuator of claim 1 further comprising the linear input mechanism, wherein the linear input mechanism is a hydraulic piston.

9. The rotary hydraulic actuator of claim 8 further comprising a plurality of hydraulic pistons, the ballscrew being coupled between the hydraulic pistons.

10. A rotary hydraulic actuator coupled between a reference surface and an actuated surface, wherein the actuated surface is moveable relative to the reference surface, the rotary hydraulic actuator comprising:
    a ballscrew assembly having a stationary portion and a ballscrew shaft that circumscribes a central axis, the stationary portion being coupled to the reference structure, the ballscrew shaft being arranged between the reference surface and the actuated surface, wherein the ballscrew shaft circumscribes a central axis;
    a linear input mechanism coupled to the ballscrew assembly; and
    an output assembly that is coupled to the actuated surface and includes a ballnut, the ballnut being concentrically arranged over the ballscrew shaft, the ballscrew assembly and the output assembly at least partly forming a first ball race and a second ball race, the output assembly having a thrust bearing coupled between the output assembly and the stationary portion of the ballscrew assembly that restricts axial movement of the output assembly,
    wherein one of the first ball race and the second ball race is helically inclined relative to the central axis and the other of the first ball race and the second ball race linearly extends along the central axis, the first ball race and the second ball race being arranged between the ballscrew assembly and the output assembly for converting linear movement from the linear input mechanism to rotary movement of the output assembly, and
    wherein a ball return for at least one of the first ball race and the second ball race is located at a radial distance from the central axis that is equal to a radial distance from the central axis at which the corresponding one of the first ball race and the second ball race is located, wherein the ball return is arranged at an axial end of the corresponding one of the first ball race and the second ball race and includes a u-turn passage.

11. The rotary hydraulic actuator of claim 10, wherein the ballnut assembly includes a first axial end and a second axial end distally opposite the first axial end, each of the first ball race and the second ball race having a loaded track portion and an unloaded track portion, the loaded track portions and the unloaded track portions extending between the first axial end and the second axial end.

12. The rotary hydraulic actuator of claim 11, wherein the loaded track portions and the unloaded track portions of the first ball race and the second ball race are adjacent and extend parallel relative to one another.

13. The rotary hydraulic actuator of claim 11 further comprising a ball return structure located at the first end and the second end of the ballscrew assembly.

14. The rotary hydraulic actuator of claim 10, wherein the first ball race is helically inclined and the second ball race is linear.

15. The rotary hydraulic actuator of claim 10, wherein the first ball race is linear and the second ball race is helically inclined.

16. The rotary hydraulic actuator of claim 15, wherein the unloaded track portion of the first ball race is located at a radial distance relative to the central axis that is equal to a radial distance at which the loaded track portion of the first ball race is located relative to the central axis.

17. A rotary hydraulic actuator coupled between a reference surface and an actuated surface that is moveable relative to the reference surface, the rotary hydraulic actuator comprising:
   a reciprocating linear hydraulic piston;
   a ballscrew mechanism driven by the linear hydraulic piston, the ballscrew mechanism having a nested ballscrew and a ballnut arranged along a central axis, the ballscrew being fastened to the linear hydraulic piston;
   a first ball race formed at least partly by the ballscrew mechanism, wherein the first ball race has a plurality of loaded track portions and a plurality of unloaded track portions that are arranged in an alternating arrangement;
   a rotary output mechanism concentrically surrounding the ballnut or the ballscrew and having a thrust bearing for constraining linear movement of the rotary output mechanism, the rotary output mechanism at least partly forming a second ball race that is concentrically and radially arranged over the first ball race, wherein the second ball race has a plurality of loaded track portions and a plurality of unloaded track portions that are arranged in an alternating arrangement; and
   a ball return portion arranged between the plurality of loaded track portions and the plurality of unloaded track portions of at least one of the first ball race and the second ball race,
   wherein one of the first ball race and the second ball race is helically inclined relative to the central axis and the other of the first ball race and the second ball race extends linearly along the central axis, the first ball race and the second ball race being arranged between the ballscrew mechanism and the rotary output mechanism for converting linear movement from the linear hydraulic piston to rotary movement of the rotary output mechanism, and
   wherein a ball return for the second ball race is located at a radial distance from the central axis that is equal to a radial distance from the central axis at which the second ball race is located, wherein the ball return is arranged at an axial end of the second ball race.

\* \* \* \* \*